US008309914B2

(12) United States Patent
Guna et al.

(10) Patent No.: US 8,309,914 B2
(45) Date of Patent: Nov. 13, 2012

(54) METHOD OF OPERATING A LINEAR ION TRAP TO PROVIDE LOW PRESSURE SHORT TIME HIGH AMPLITUDE EXCITATION WITH PULSED PRESSURE

(75) Inventors: Mircea Guna, Toronto (CA); Yves Le Blanc, Newmarket (CA); Bruce Collings, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 642 days.

(21) Appl. No.: 12/359,526

(22) Filed: Jan. 26, 2009

(65) Prior Publication Data

US 2009/0194684 A1 Aug. 6, 2009

Related U.S. Application Data

(60) Provisional application No. 61/025,057, filed on Jan. 31, 2008.

(51) Int. Cl.
*B01D 59/44* (2006.01)
*H01J 49/00* (2006.01)

(52) U.S. Cl. ........ 250/282; 250/283; 250/287; 250/281; 250/288; 250/289; 250/290; 250/291; 250/292

(58) Field of Classification Search .......... 250/281-283, 250/287-289, 290-292
See application file for complete search history.

(56) References Cited

U.S. PATENT DOCUMENTS 6,787,760 B2 9/2004 Belov et al.
6,833,544 B1 * 12/2004 Campbell et al. ............. 250/282
6,881,134 B2 4/2005 Brown
6,949,743 B1 * 9/2005 Schwartz ....................... 250/290
6,960,762 B2 * 11/2005 Kawato et al. ................ 250/288

OTHER PUBLICATIONS

Vladimir M. Doroshenko and Robert J. Cotter, "Pulsed Gas Introduction for Increasing Peptide CID Efficiency in a MALDI/ Quadrupole Ion Trap Mass Spectrometer", Anal. Chem., 1996, 68, 463-472.

(Continued)

*Primary Examiner* — Jack Berman
*Assistant Examiner* — Meenakshi Sahu

(57) ABSTRACT

Methods for fragmenting ions in an ion trap are described. These methods involve a) selecting parent ions for fragmentation; b) retaining the parent ions within the ion trap for a retention time interval, the ion trap having an operating pressure of less than about $1\times10^{-4}$ Torr; c) providing a RF trapping voltage to the ion trap to provide a Mathieu stability parameter q at an excitement level during an excitement time interval within the retention time interval; d) providing a resonant excitation voltage to the ion trap during the excitement time interval to excite and fragment the parent ions; e) providing a non-steady-state pressure increase of at least 10% of the operating pressure within the ion trap by delivering a neutral gas into the ion trap for at least a portion of the retention time interval to raise the pressure in the ion trap to a varying first elevated-pressure in the range between about $6\times10^{-5}$ Torr to about $5\times10^{-4}$ Torr for a first elevated-pressure duration; and f) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap. The excitation time interval and the first elevated-pressure duration substantially overlap in time.

24 Claims, 17 Drawing Sheets

OTHER PUBLICATIONS

Richard W. Vachet and Gary L. Glish, “Effects of Heavy Gases on the Tandem Mass Spectra of Peptide Ions in the Quadrupole Ion Trap”, American Society Mass Spectrometry 1996, 7, 1994-1202.

Brad I. Coopersmith and Richard A. Yost, “Internal Pulsed Valve Sample Introduction on a Quadrupole Ion Trap Mass Spectrometer”, American Society for Mass Spectrometry, 1995, 6, 976-980.

J. Murrell et al., “Fast Excitation CID in a Quadrupole Ion Trap Mass Spectrometer”, American Society for Mass Spectrometry, 2003, 14, 785-789.

T.J. Carlin and B.S. Freiser, “Pulsed Valve Addition of Collision and Reagent Gases in Fourier Transform Mass Spectrometry”, Analytical Chemistry, vol. 55, No. 3, Mar. 1983.

Bruce Collings, “Information for a disclosure on using a pulsed valve to improve ion fragmentation efficiencies in an ion trap”, Pulsed valve for ms3, Jan. 20, 2006.

PCT/CA2009/000088, International Search Report and Written Opinion.

* cited by examiner

METHOD OF OPERATING A LINEAR ION TRAP TO PROVIDE LOW PRESSURE SHORT TIME HIGH AMPLITUDE EXCITATION WITH PULSED PRESSURE

This is a non-provisional application of U.S. application No. 61/025,057 filed Jan. 31, 2008. The contents of U.S. application No. 61/025,057 are incorporated herein by reference.

FIELD

The invention relates generally to a method of operating a linear ion trap mass spectrometer.

INTRODUCTION

Ion traps are scientific instruments useful for the study and analysis of molecules. These instruments contain multiple electrodes surrounding a small region of space in which ions are confined. Oscillating electric fields and static electric fields are applied to the electrodes to create a trapping potential. Ions that move into this trapping potential become "trapped"—that is, restricted in motion to the ion-confinement region.

During their retention in the trap, a collection of ionized molecules may be subjected to various operations (such as, for example without limitation, fragmentation or filtering). The ions can then be transmitted from the trap into a mass spectrometer, where a mass spectrum of the collection of ions can be obtained. Alternatively, the ions can be scanned out of the trap to directly obtain the mass spectrum. The spectrum reveals information about the composition of the ions. Following this procedure the chemical makeup of an unknown sample can be discerned, providing useful information for the fields of medicine, chemistry, security, criminology, and others.

SUMMARY

Ion fragmentation is a process that breaks apart, or dissociates, an ion into some or all of its constituent parts. Commonly, this is carried out in an ion trap by applying an alternating electric potential (RF potential) to electrodes of the trap to impart kinetic energy to the ions in the trap. The accelerated ions can collide with other molecules within the trap, resulting, for sufficiently high collision energies, in fragmentation of the ions. However, not all RF potentials result in fragmentation of the ions. Some RF potentials due, for example, to the RF frequency, amplitude or both, place ions on trajectories such that the ions collide with elements of the ion trap, or are ejected from the trap. Other oscillatory motions may not be of sufficient amplitude, and thus may impart insufficient energy to fragment the ions. In some of these low-amplitude, low-energy cases, the ions may even lose energy during a collision. In addition, much of the art indicates that high collision gas pressures, e.g. in the $10^{-3}$ Torr and greater range, and/or high excitation amplitudes, e.g. in the 600 mV (ground to peak) and greater range, are necessary to achieve high fragmentation efficiency.

In various embodiments, methods for operating an ion trap are provided that produce fragment ions using lower collision gas pressures and lower RF excitation amplitudes than used in traditional methods. In various embodiments, methods are provided that use lower collision gas pressures, lower RF excitation amplitudes and longer excitation times than in traditional methods. In various embodiments, methods are provided for use with a linear ion trap comprising a RF multipole where the rods (radial confinement electrodes) of the multipole have substantially circular cross-sections.

In various embodiments, the ion trap comprises a quadrupole linear ion trap, having rods (radial electrodes) with substantially circular cross-sections that can produce ion-trapping fields having nonlinear retarding potentials. In various embodiments, the substantially circular cross-section electrodes facilitate reducing losses of ions due to collisions with the electrodes through a dephasing of the trapping RF field and the ion motion.

In various embodiments, the amplitude of the auxiliary alternating potential, or resonant excitation voltage amplitude, is one or more of: (a) less than about 250 mV (zero to peak); (b) less than about 125 mV (zero to peak); (c) in the range between about 50 mV (zero to peak) to about 250 mV (zero to peak); and/or (d) in the range between about 50 mV (zero to peak) to about 125 mV (zero to peak); and/or (e) in the range between about 50 mV and about 100 mV. In various embodiments, the auxiliary alternating potential is applied for an excitation time that is one or more of: (a) greater than about 10 milliseconds (ms); (b) greater than about 20 ms; (a) greater than about 30 ms; (c) in the range between about 2 ms and about 50 ms; and/or, (d) in the range between about 1 ms and about 150 ms. The duration of application of the auxiliary alternating potential can be chosen to substantially coincide with the delivery of the neutral gas. Alternatively, the delivery of the neutral gas may commence slightly before, say several milliseconds before, starting application of the auxiliary alternating potential; however, the duration of application of the auxiliary alternating potential can still be chosen to substantially overlap in time with the delivery of the neutral gas.

In various embodiments, while the ions are retained in the trap, a neutral gas is delivered, e.g., by injection with a pulsed valve, into the trap for a duration of less than about 30 milliseconds. In various embodiments, the delivery of neutral gas is terminated prior to the end of the ion retention time. After the excitation time the residual gas can be evacuated from the ion chamber, so that the pressure within the chamber restores to a first restored pressure value suitable for further ion processing, e.g., for ion cooling, subsequent ion processing, etc., including, but not limited to, ion selection, ion detection, excitation, cooling and mass analyzing. In various embodiments, the first restored pressure value can be in a range between about $2\times10^{-5}$ Torr to about $5.5\times10^{-5}$ Torr.

In various embodiments, the amplitude of the auxiliary alternating potential can be selected to be in a pre-desired range corresponding to a particular mass range, and/or mass ranges, of ions to be excited. For example, the excitation amplitude can be: in a range between about 50 $\text{millivolts}_{(0\text{-}pk)}$ to about 300 $\text{millivolts}_{(0\text{-}pk)}$ for ions having a mass within a range between about 50 Da to about 500 Da; in a range between about 100 $\text{millivolts}_{(0\text{-}pk)}$ to about 1000 $\text{millivolts}_{(0\text{-}pk)}$ for ions having a mass within a range between about 500 Da to about 5000 Da; etc. The excitation time interval can be varied inversely with the auxiliary alternating potential.

The motion of a particular ion is controlled by the Mathieu parameters a and q of the mass analyzer. For positive ions, these parameters are related to the characteristics of the potential applied from terminals to ground as follows:

$$a_x = -a_y = a = \frac{8eU}{m_{ion}\Omega^2 r_0^2}$$

and $$q_x = -q_y = q = \frac{4\ \mathrm{eV}}{m_{ion}\Omega^2 r_0^2}$$

where e is the charge on an ion, $m_{ion}$ is the ion mass, Q=2πf where f is the RF frequency, U is the DC voltage from a pole to ground and V is the zero to peak RF voltage from each pole to ground. If the potentials are applied with different voltages between pole pairs and ground, U and V are ½ of the DC potential and the zero to peak AC potential respectively between the rod pairs. Combinations of a and q that give stable ion motion in both the x and y directions are usually shown on a stability diagram.

In various embodiments, the first elevated pressure value is one or more of: (a) less than about $5\times10^{-4}$ Torr; (b) less than about $3\times10^{-4}$ Torr; (c) in the range between about $5.5\times10^{-5}$ to about $5\times10^{-4}$ Torr; (d) in the range between about $5.5\times10^{-5}$ to about $3\times10^{-4}$ Torr; and/or (c) in the range between about $1\times10^{-4}$ Torr to about $5\times10^{-4}$ Torr. A variety of neutral gases can be used to create the non-steady state pressure increase including, but not limited to, hydrogen, helium, nitrogen, argon, oxygen, xenon, krypton, methane, and combinations thereof.

In various embodiments, methods are provided for increasing the retention of low-mass fragments of the parent ion after termination of the excitation potential. In various embodiments, after termination of the excitation potential, the q value of the trapping alternating potential (trapping RF) is lowered. The reduction of the q of the RF trapping potential can be reduced to allow the remaining hot (excited) parent ions to continue dissociating, and to retain more of the low-mass fragments. A reduction of the Mathieu stability q parameter can be accomplished by reducing the RF trapping potential amplitude and/or increasing the angular frequency of the RF trapping potential. In various embodiments, these methods facilitate extending the mass range of the fragmentation spectrum towards lower mass values. In various embodiments, q is reduced by at least 10% and sometimes by at least 30% or 60%.

In various embodiments, methods of the present invention can increase the range of ion fragment masses retained in the ion trap by reducing the value of q after initial excitation of the parent ion. For example, a parent ion can be excited initially with a q value of $q_{exc}$ followed by a reduction in q to a value of $q_h$. The value $q_h$ can be determined experimentally as the high-mass cut-off value of q for the parent ion, i.e. the lowest value of q that may be used and still retain the parent ion in the trap. The lowering of the q value results in a percentage increase Δ % of the range of ion fragment masses retained in the ion trap by the amount $$\Delta\ \% = 100\times\frac{(q_{exc}-q_h)}{(0.908-q_{exc})} \quad (2)$$

where the percentage increase is expressed in relation to the initial range of ion fragment masses retained in the trap, i.e. m−LMCO.

In various embodiments, methods are provided for increasing the retention of low-mass fragments of the parent ion after termination of the excitation potential. In various embodiments, after termination of the excitation potential and termination of neutral gas delivery, the pressure in the trap is reduced and the q value of the trapping alternating potential (trapping RF) is lowered. The reduction of pressure increases the mean time between collisions, thus providing more time for internally “hot” ions to fragment. With the reduced thermalization rates the timescale for fragmentation after the excitation is turned off can be extended several milliseconds or more. In various embodiments, the q of the RF trapping potential can be reduced to allow the remaining hot parent ions to continue dissociating, and to retain more of the low-mass fragments. The Mathieu stability q parameter can be reduced by reducing the RF trapping potential amplitude and/or increasing the angular frequency of the RF trapping potential. In various embodiments, these methods facilitate extending the mass range of the fragmentation spectrum towards lower mass values.

In various embodiments provided are methods for fragmenting ions comprising the steps of: (a) retaining the ions for a retention time in an ion-confinement region of a linear ion trap comprising a RF quadrupole portion with a first trapping alternating potential having a first Mathieu stability parameter q value associated the RF quadrupole portion; (b) providing a non-steady-state pressure increase of at least 10% of the operating pressure within the ion trap by delivering a neutral gas into the ion trap for at least a portion of the retention time interval to raise the pressure in the ion trap to a varying first elevated-pressure in the range between about $6\times10^{-5}$ Torr to about $5\times10^{-4}$ Torr for a first elevated-pressure duration; (c) exciting at least a portion of the ions within the ion-confinement region by subjecting them to an auxiliary alternating electrical field for an excitation time; (d) varying one or more of the amplitude and the angular frequency of the first trapping alternating potential to provide a second trapping alternating potential having a second Mathieu stability parameter q value lower than the first Mathieu stability parameter q value; (e) ejecting the ions from the ion trap at the end of the retention time. The decrease in q can comprise one or more of a substantially linear decrease in time, a substantially piecewise linear decrease in time, a substantially nonlinear decrease in time, and combinations thereof. In various embodiments, the ejected ions are subjected to further ion processing, e.g., mass analysis, while in other embodiments ejection of the ions occurs in a mass selective manner (MSAE: mass selective axial ejection), such that there is no need for a further mass analysis stage.

In accordance with an aspect of a further combined pressure pulse/drop in q embodiment of the invention, there is provided a method for fragmenting ions in an ion trap of a mass spectrometer comprising a) selecting parent ions for fragmentation; b) retaining the parent ions within the ion trap for a retention time interval, the ion trap having an operating pressure of less than about 1x10−4 Torr; c) providing a RF trapping voltage to the ion trap to provide a Mathieu stability parameter q at an excitement level during an excitement time interval within the retention time interval; d) providing a resonant excitation voltage to the ion trap during the excitement time interval to excite and fragment the parent ions; e) providing a non-steady-state pressure increase of at least 10% of the operating pressure within the ion trap by delivering a neutral gas into the ion trap for at least a portion of the retention time interval to raise the pressure in the ion trap to a varying first elevated-pressure in the range between about $6\times10^{-5}$ Torr to about $5\times10^{-4}$ Torr for a first elevated-pressure duration; and, f) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap; wherein the excitation time interval and the first elevated-pressure duration substantially overlap in time. In various embodiments, the excitement level of q can be a) between about 0.15 and about 0.9; and b) between about 0.15 and about 0.39. In various embodiments, the resonant excitation voltage is terminated substantially concurrently with the RF trapping voltage applied to the ion trap being changed to reduce the Mathieu stability parameter q to the hold level.

In various embodiments, the hold level of q can be above 0.015 and can be at least ten percent less than the excitement level of q. In various embodiments, the excitement time interval is determined based at least partly on the operating pressure in the ion trap, such that the excitement time interval varies inversely with the operating pressure in the ion trap. Further, an amplitude of the resonant excitation voltage can be determined based at least partly on the operating pressure in the ion trap, such that the amplitude of the resonant excitation voltage varies inversely with the operating pressure in the ion trap. In various embodiments, the hold level of q is determined to be i) sufficiently high to retain the parent ions within the ion trap, and ii) sufficiently low to retain within the ion trap fragments of the parent ions having a fragment m/z less than about one fifth of a parent m/z of the parent ions.

In various embodiments of the present invention, including the combined pressure pulse/drop in q embodiment described immediately above, the neutral gas is delivered by injecting the neutral gas from one or more pulsed valves. In various embodiments of the present invention, the neutral gas comprises one or more of hydrogen, helium, nitrogen, argon, oxygen, xenon, krypton, methane, and combinations thereof. In various embodiments of the present invention, e) (providing a non-steady-state pressure increase of at least 10% of the operating pressure within the ion trap) comprises starting delivering the neutral gas into the ion trap before the excitement time interval; the first restored-pressure value is in the range between about $2\times10^{-5}$ Torr to about $5.5\times10^{-5}$ Torr. In various embodiments, the non-steady-state pressure increase is at least 50% or, in some embodiments, 100% of the operating pressure within the ion trap.

A 4000 QTRAP™ system (Applied Biosystems|MDS Sciex) was used for collection of MS data and all detection were performed in positive ion mode using TurboIonspray™. Experiments were also performed on a modified instrument allowing the introduction of a pulsed gas into the trapping region. When MS3 is performed on a QqLIT, the first stage of fragmentation (MS2) occurs via collision induced dissociation (CID) in the collision cell. The fragments generated in the collision cell were transferred for a specific amount of time to the LIT at a given energy (typically 8 eV). After a brief cooling period, the fragment of interest was isolated by applying resolving DC and the excitation step was initiated. Typically, with the transfer energy used, the excitation time varies between 70-100 ms depending on the nature of the fragment ion. When the energy used to transfer the fragment ions was increased, it was observed that there was sufficient residual internal energy in the fragment ion such that less time was required for the excitation and capture of low mass fragment ions (typically associated with more energetic fragmentation). Using this approach, the MS3 fragmentation was performed with an excitation time in the order of 20 ms. The use of a pulsed valve to increase the local pressure in various embodiments, showed benefits, for example, in the form of a further increase in fragmentation efficiency.

These and other features of the Applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DESCRIPTION OF VARIOUS EMBODIMENTS OF THE INVENTION

Prior to further describing various embodiments of the present teachings it may be useful to an understanding thereof to describe the use of various terms used herein and in the art.

One term relevant to the ion fragmentation process is "fragmentation efficiency", which can be defined as a measure of the amount of parent molecules that are converted into fragments. A fragmentation efficiency of 100% means that all parent molecules have been broken into one or more constituent parts. Additional relevant terms include the speed at which the fragments can be produced, and the speed at which they can be made available for subsequent ion processing.

A variety of ion traps are known, of which one type of ion trap is the linear ion trap comprising a RF multipole for radial confinement of the ions and often end electrodes for axial confinement of ions. A RF multipole comprises an even number of elongate electrodes commonly referred to as rods, which are also referred to as radial confinement electrodes herein to distinguish them from end electrodes often found in linear ion traps. A RF multipole with four rods is called a quadrupole, one with six a hexapole, with eight an octopole, etc. The cross-sections of these electrodes (although commonly called rods) are not necessarily circular. For example, hyperbolic cross-section electrodes (electrodes where opposing faces have a hyperbolic shape) can also be used. See, e.g., "Prediction of quadrupole mass filter performance for hyperbolic and circular cross section electrodes" by John Raymond Gibson and Stephen Taylor, Rapid Communications in Mass Spectrometry, Vol. 14, Issue 18, Pages 1669-1673 (2000). In various embodiments, a RF multipole can be used to trap, filter, and/or guide ions by application of a DC and AC potential to the rods of the multipole. The AC component of the electrical potential is often called the RF component, and can be described by the amplitude and the oscillatory frequency. More than one RF component can be applied to an RF multipole. In various embodiments of an ion trap, a trapping RF component is applied to radially confine ions within the multipole for a retention time interval and an auxiliary RF component, applied across two or more opposing rods of the multipole for an ion excitation time interval, can be used to impart translational energy to the ions.

Figure 1A:
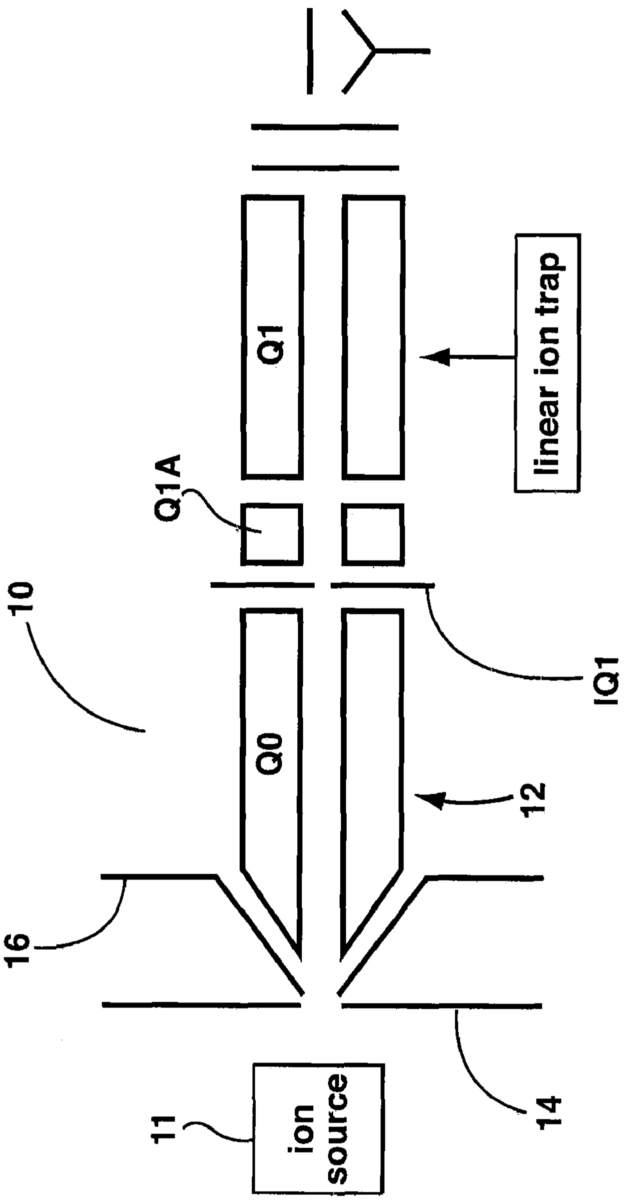
FIG. 1*a*, in a schematic diagram, illustrates a Q-trap linear ion trap mass spectrometer.

Referring to FIG. 1*a*, there is illustrated in a schematic diagram a particular variant of a q-trap ion trap mass spectrometer as described, for example, in U.S. Pat. No. 6,504,148, and by Hager and Le Blanc in rapid communications of mass spectrometry, 2003, 17, 1056-1064, and that is suitable for use for implementing a method in accordance with an aspect of the present invention. It will also be appreciated by others skilled in the art that different mass spectrometers may be used to implement methods in accordance with different aspects of the present invention.

During operation of the mass spectrometer, ions are admitted into a vacuum chamber 12 through an orifice plate 14 and skimmer 15. Any suitable ion source 11, such as, for example, MALDI, NANOSPRAY or ESI, can be used. The mass spectrometer system 10 comprises two elongated sets of rods Q0 and Q1. These sets of rods may be quadrupoles (that is, they may have four rods) hexapoles, octopoles, or have some other suitable multipole configurations. Orifice plate IQ1 is provided between rods set Q0 and Q1. In some cases fringing fields between neighboring pairs of rod sets may distort the flow of ions. Stubby rods Q1*a* can help to focus the flow of ions into the elongated rod set Q1.

In the system shown in FIG. 1*a*, ions can be collisionally cooled in Q0, while Q1 operates as a linear ion trap. Typically, ions can be trapped in linear ion traps by applying RF voltages to the rods, and suitable trapping voltages to the end aperture lens. Of course, no actual voltages need be provided to the end lens themselves, provided an offset voltage is applied to Q1 to provide the voltage difference to axially trap the ions.

Figure 1B:
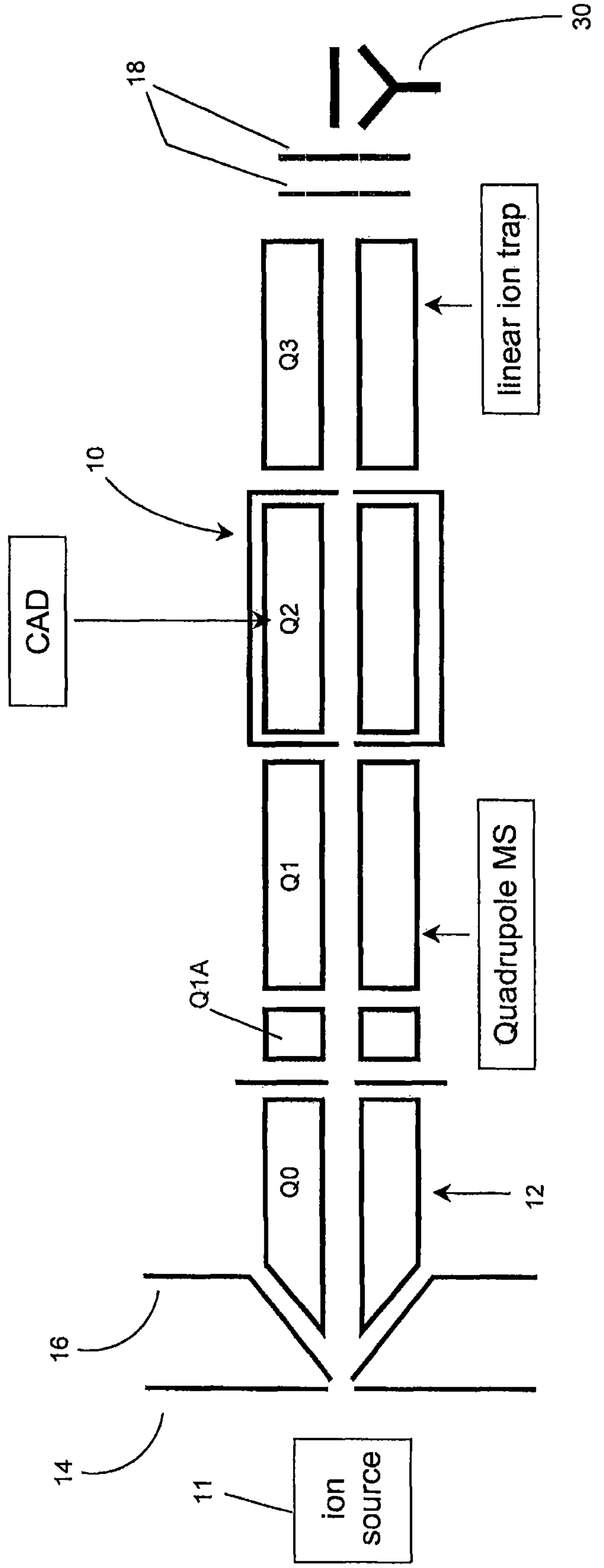
FIG. 1*b*, in a schematic diagram, illustrates a Q-trap Q-q-Q linear ion trap mass spectrometer.

Referring to FIG. 1*b*, there is illustrated in a schematic diagram a Q-q-Q ion trap mass spectrometer. Either of the mass spectrometer systems 10 of FIG. 1*a* or FIG. 1*b* can be used to implement methods in accordance with different aspects of the present invention. For clarity, the same reference numerals are used to designate like elements of the mass spectrometer systems 10 of FIG. 1*a* and FIG. 1*b*. For brevity, the description of FIG. 1*a* is not repeated with respect to FIG. 1*b*.

In the configuration of the linear ion trap mass spectrometer system 10 of FIG. 1*b*, Q1 operates as a conventional transmission RF/DC quadrupole mass spectrometer, and Q3 operates as a linear ion trap. Q2 is a collision cell in which ions collide with a collision gas to be fragmented into products of lesser mass. In some cases, Q2 can also be used as a reaction cell in which ion-neutral or ion-ion reactions occur to generate other types of fragments or adducts.

In operation, after a group of precursor ions are admitted to Q0, and cooled therein, a particular precursor or parent ion of interest can be selected for in Q1, and transmitted to Q2. In the collision cell Q2, this parent or precursor of interest could, for example, be fragmented to produce a fragment of interest, which is then ejected from Q2 to linear ion trap Q3. Within Q3, this fragment of interest from Q2, can become the parent of interest in subsequent mass analysis conducted in Q3, as described in more detail below.

Figure 2A:
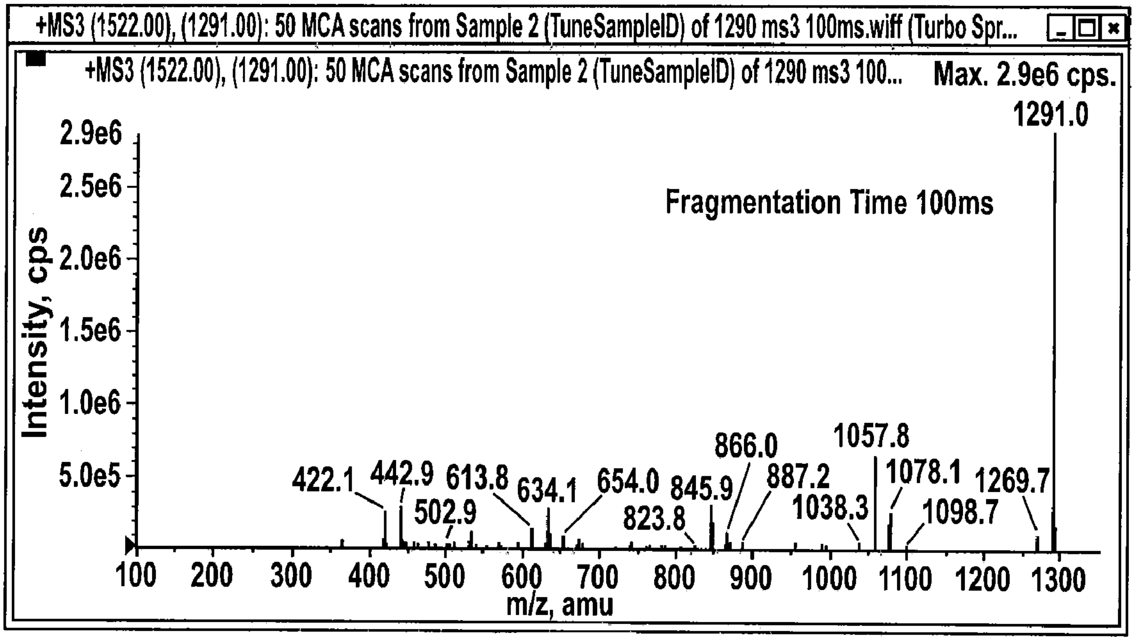
FIG. 2*a*, in a graph, illustrates a spectrum for a 1290 Da parent ion obtained using the linear ion trap mass spectrometer system of FIG. 1*b*, a fragmentation or excitation time interval of 100 ms, and a resonant excitation voltage amplitude of 50 mV, zero-to-peak.
Figure 2B:
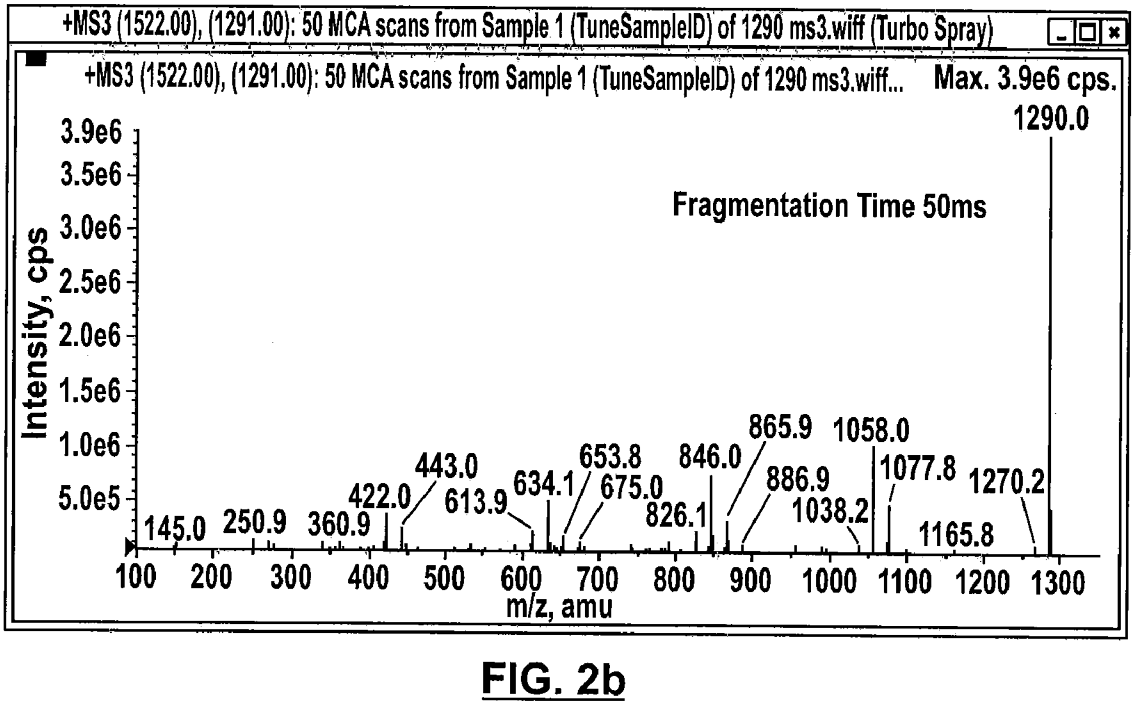
FIG. 2*b*, in a graph, illustrates a spectrum obtained for a 1290 Da parent ion using the linear ion trap mass spectrometer system of FIG. 1*b*, a fragmentation or excitation time interval of 50 ms, and a resonant excitation voltage amplitude of 50 mV, zero-to-peak.

Referring to FIGS. 2*a* and 2*b*, fragmentation spectra of a parent ion having a mass of 1290 Da are illustrated. The fragmentation spectra are generated by the linear ion trap Q3 of FIG. 1*b*. The parent ion analyzed in Q3, could be obtained by selecting for suitable precursor ions in Q1, and then fragmenting these precursor ions in Q2 to provide the parent ion of mass 1290 Da, among other ions. This parent ion of mass 1290 Da could then be transmitted to Q3. As shown on the graphs, different fragmentation times but the same excitation voltage, 100 $mV_{p-p}$ were used. As marked on the graphs, the fragmentation time or excitation time interval for the mass spectrum for FIG. 2*a* was 100 milliseconds, and the fragmentation time or excitation time interval for the spectrum of FIG. 2*b* was 50 milliseconds. In both cases, the pressure in Q3 was approximately $3.5\times10^{-5}$ Torr. To obtain the spectra of both FIGS. 2*a* and 2*b*, one value of q was used: 0.236. Generally, ions become unstable at q values of over 0.907. The lower mass cut off for both spectra is approximately 26% of the mass of the parent ion, or about 335 Da, which is typical of much of the art. The spectrum of FIG. 2*b* includes no apparent peaks below this mass threshold. The spectrum of FIG. 2*a* shows only very small peaks around or below the lower mass cut off of 335 Da.

Figure 3A:
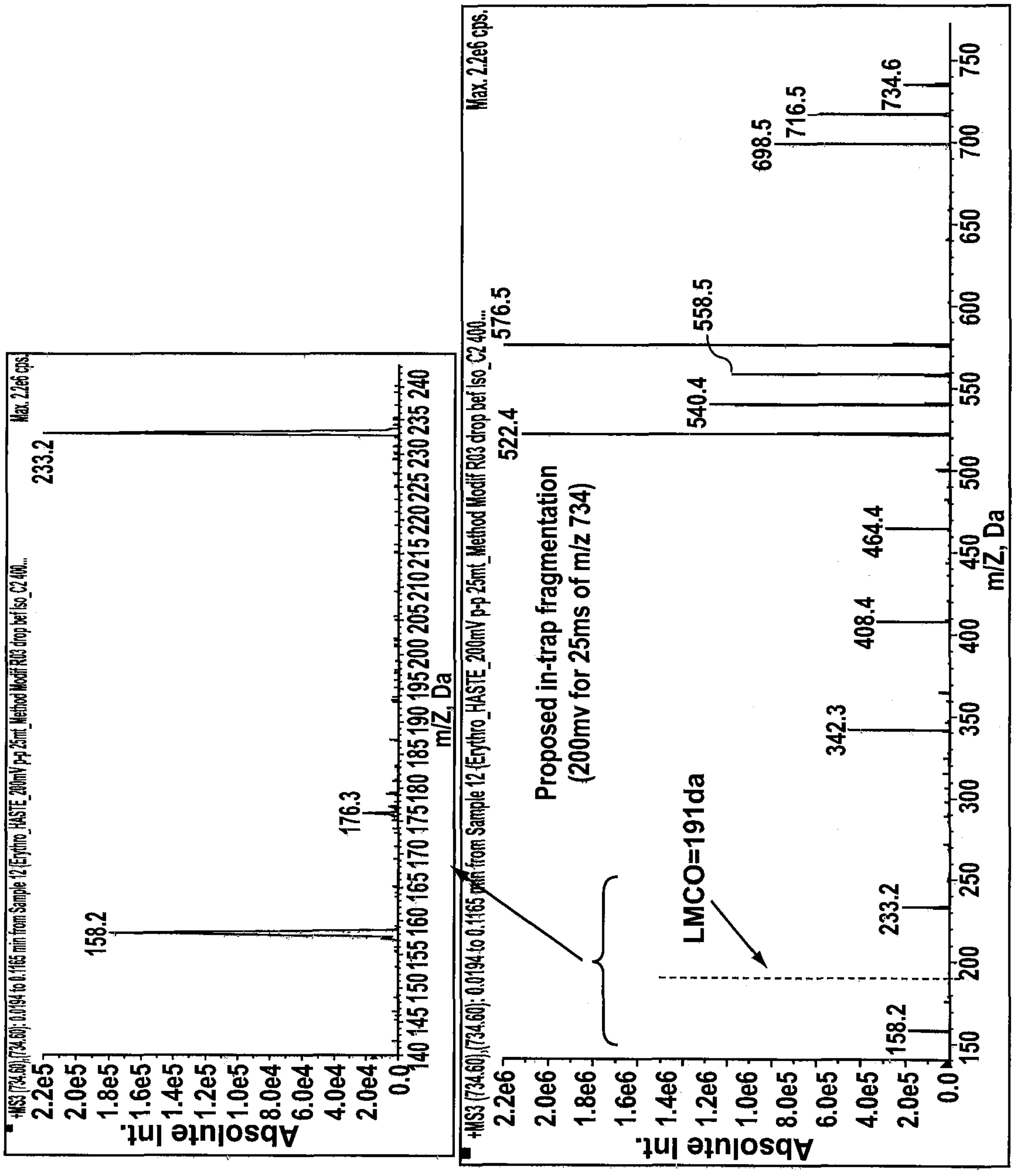
FIG. 3*a*, in a graph, illustrates a spectrum for a 734 Da parent ion obtained using the linear ion trap mass spectrometer system of FIG. 1*b*, a fragmentation or excitation time interval of 25 ms, and a resonant excitation voltage amplitude of 100 mV, zero-to-peak.
Figure 3B:
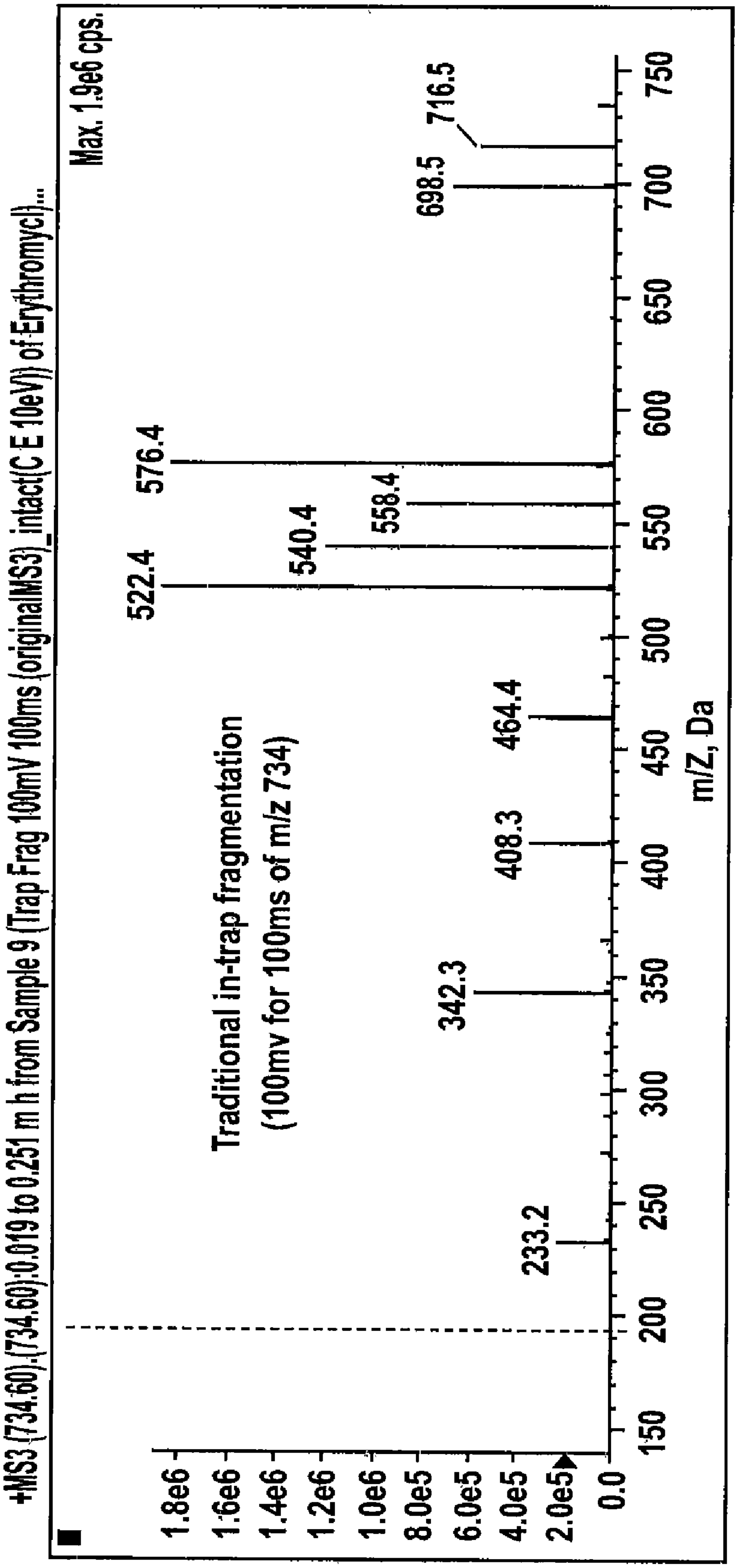
FIG. 3*b*, in a graph, illustrates a spectrum for a 734 Da parent ion obtained using the linear ion trap mass spectrometer system of FIG. 1*b*, a fragmentation or excitation time interval of 100 ms, and a resonant excitation voltage amplitude of 50 mV, zero-to-peak.

Referring to FIGS. 3*a* and 3*b*, spectra obtained for an ion of m/z of 734 Da are illustrated. Similar to the mass spectra of FIGS. 2*a* and 2*b*, the mass spectra of FIGS. 3*a* and 3*b* were generated using Q3 of the mass spectrometer system 10 of FIG. 1*b*. In this case, Q3 was operated at a pressure of $4.5\times10^{-5}$. In the case of the spectrum of FIG. 3*a*, q was initially held at an excitement level of 0.236, before being dropped to a hold level of 0.16. More specifically, q was held at the level of 0.236 for 25 ms during fragmentation, after which q was dropped to 0.16. During fragmentation, the resonant excitation voltage amplitude was 200 mV.

The spectrum of FIG. 3*b* was generated by providing 100 mV resonant excitation voltage amplitude to Q3 for a fragmentation time of 100 ms. Similar to the spectrum of FIG. 3*a*, to provide the spectrum of FIG. 3*b*, the value of q was dropped from an initial value of 0.236 during this fragmentation time to a hold value of q of 0.16.

Comparison of the spectra of FIGS. 3*a* and 3*b* makes it clear that significant gains in the lower mass cut off can be obtained by decreasing the fragmentation time and reducing q after this fragmentation time to help retain ions of low mass. Thus, in the spectrum of FIG. 3*a*, there is a significant peak at 158.2 Da, which is well below 191 Da or 26% of 735 Da. In contrast, where q is maintained at the higher level of 0.236 for a longer excitation time interval of 100 milliseconds, there are no significant peaks below the 191 Da threshold. Thus, significant gains can be obtained by cutting the fragmentation time or excitation time interval, and dropping q after this fragmentation time. Any reduction in the fragmentation efficiency resulting from this drop in the fragmentation time can to some extent be compensated for by increasing the resonant excitation voltage amplitude. That is, comparing the mass spectra of FIGS. 3*a* and 3*b*, the peaks are largely the same above the threshold of 191 Da, a difference being that below the threshold of 191 Da, a peak is shown in the spectrum of FIG. 3*a*, but not in that of FIG. 3*b*.

Figure 4:
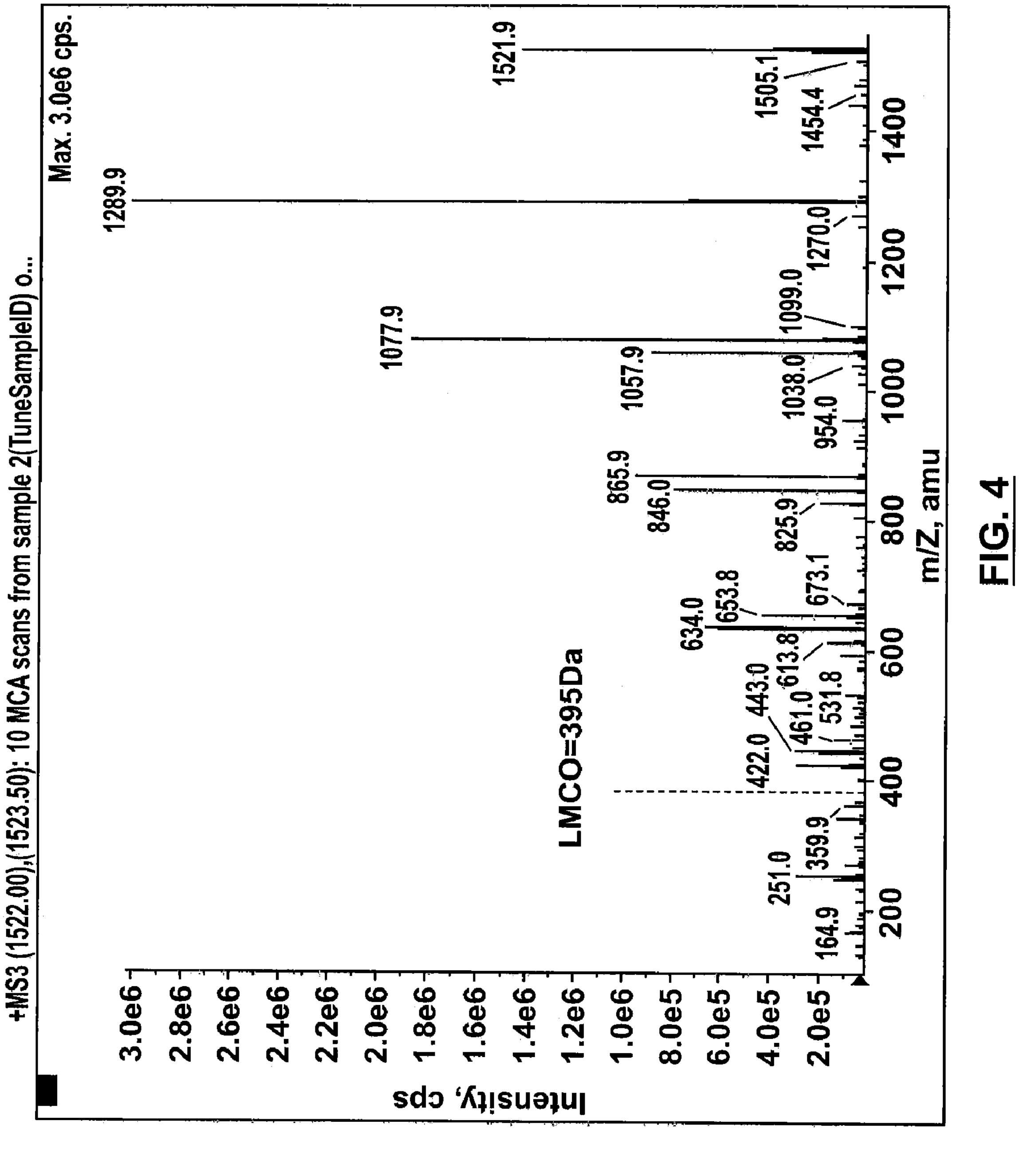
FIG. 4, in a graph, illustrates a spectrum for a 1522 Da parent ion obtained using the linear ion trap mass spectrometer system of FIG. 1*b*, a fragmentation or excitation time interval of 100 ms, and a resonant excitation voltage amplitude of 75 mV, zero-to-peak.

While the spectra of FIGS. 3*a* and 3*b* seem to indicate that shorter fragmentation times can be advantageous in allowing ions of lower mass to be retained, longer fragmentation times may still be suitable for tough parent ions that are relatively difficult to fragment. Referring to FIG. 4 there is illustrated in a graph, a spectrum obtained for a parent ion of m/z equal to 1522 Da. Similar to the spectra discussed above in connection with FIGS. 2*a*, 2*b*, 3*a* and 3*b*, the parent ion of FIG. 4 can be obtained by initially selecting suitable precursor ions in Q1 of the system of FIG. 1*b*, fragmenting these selected precursor ions in Q2, and then conducting further analysis of one of the fragments of these precursor ions, the 1522 Da ion, in Q3. To produce the spectrum of FIG. 4, Q3 was operated at a pressure of $3.5\times10^{-5}$ Torr. The fragmentation time was 100 milliseconds and the amplitude of the resonant excitation voltage was 150 mV. Q was kept at an excitement level of 0.236 during the fragmentation time, and then dropped to a hold level of 0.08. In this case, the lower mass cut off typical of much of the art would be 395 Da, which lower mass cut off is marked on the graph of FIG. 4.

As shown in FIG. 4, this spectrum includes peaks well below the typical lower mass cut off threshold of 395 Da. Perhaps the most significant peak occurs at 251 Da.

Figure 5:
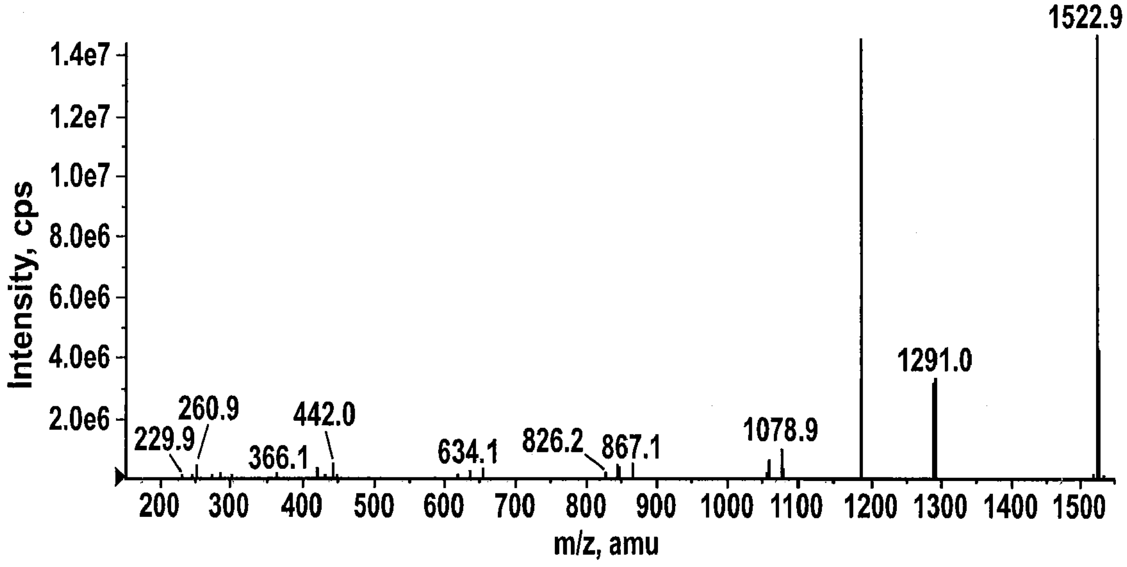
FIG. 5, in a graph, illustrates a spectrum for a 1522 Da parent ion obtained using the linear ion trap mass spectrometer system of FIG. 1*b*, a fragmentation or excitation time interval of 20 ms, and a resonant excitation voltage amplitude of 400 mV, zero-to-peak.

In addition to longer fragmentation times being suitable for tough parent ions that are relatively difficult to fragment, higher resonant excitation voltages may also be used to advantage. Referring to FIG. 5 there is illustrated in a graph, a spectrum obtained for a parent ion of m/z equal to 1522 Da. Similar to the spectra discussed above, the parent ion of FIG. 5 can be obtained by initially selecting suitable precursor ions in Q1 of the system of FIG. 1*b*, fragmenting these selected precursor ions in Q2, and then conducting further analysis of one of the fragments of these precursor ions, the 1522 Da ion, in Q3. To produce the spectrum of FIG. 5, Q3 was operated at a pressure of $4.7\times10^{-5}$ Torr. The fragmentation time was 20 milliseconds and the amplitude of the resonant excitation voltage was 800 mV. Q was kept at an excitement level of 0.4 during the fragmentation time, and then dropped to a hold level of 0.083. In this case, given the relatively high resonant excitation voltage and the value for q, the lower mass cut off typical of much of the art would be 672 Da, which lower mass cut off is marked on the graph of FIG. 5. As shown, the spectrum of FIG. 5 includes peaks well below the typical lower mass cut off threshold of 672 Da.

Figure 6:
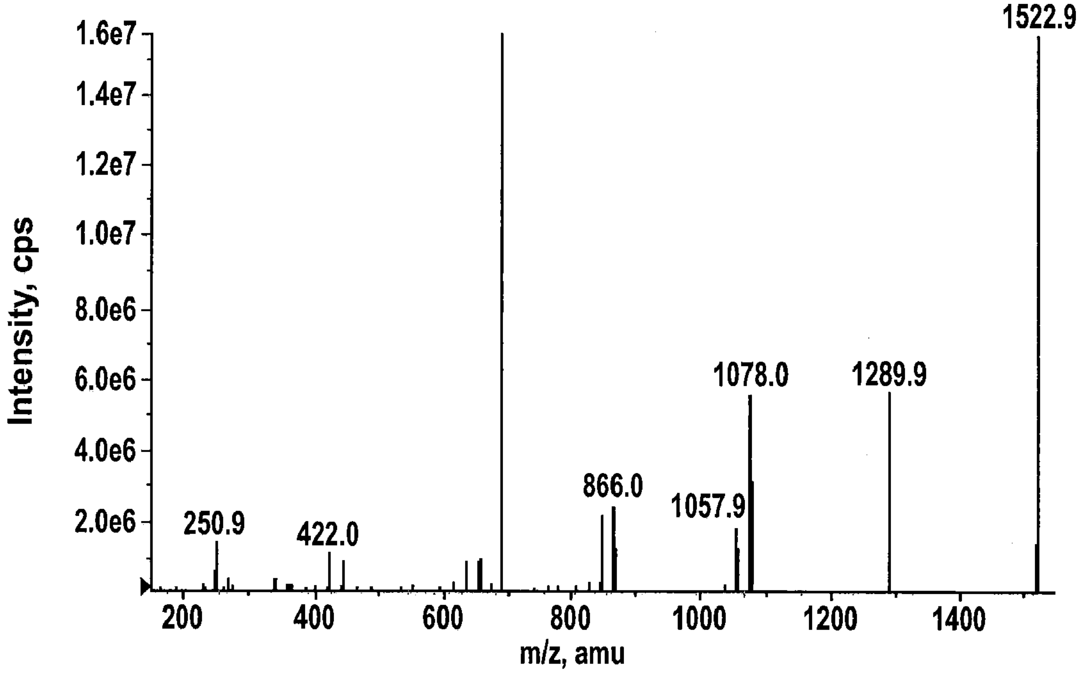
FIG. 6, in a graph, illustrates a spectrum for a 1522 Da parent ion obtained using the linear ion trap mass spectrometer system of FIG. 1*b*, a fragmentation or excitation time interval of 10 ms, and a resonant excitation voltage amplitude of 700 mV, zero-to-peak.

Still larger resonant excitation voltage amplitudes may be used. Referring to FIG. 6 there is illustrated in a graph, a spectrum obtained for a parent ion of m/z equal to 1522 Da. Similar to the spectra discussed above, the parent ion of FIG. 6 can be obtained by initially selecting suitable precursor ions in Q1 of the system of FIG. 1*b*, fragmenting these selected precursor ions in Q2, and then conducting further analysis of one of the fragments of these precursor ions, the 1522 Da ion, in Q3. To produce the spectrum of FIG. 6, Q3 was operated at a pressure of $4.7\times10^{-5}$ Torr. The fragmentation time was 10 milliseconds and the amplitude of the resonant excitation voltage was 700 mV, zero-to-peak. Q was kept at an excitement level of 0.703 during the fragmentation time, and then dropped to a hold level of 0.083. In this case, given the relatively high resonant excitation voltage and value for q, the lower mass cut off typical of much of the art would be 1181 Da, which lower mass cut off is marked on the graph of FIG. 6. As shown, the spectrum of FIG. 6 includes peaks well below the typical lower mass cut off threshold of 1181 Da.

Figure 7:
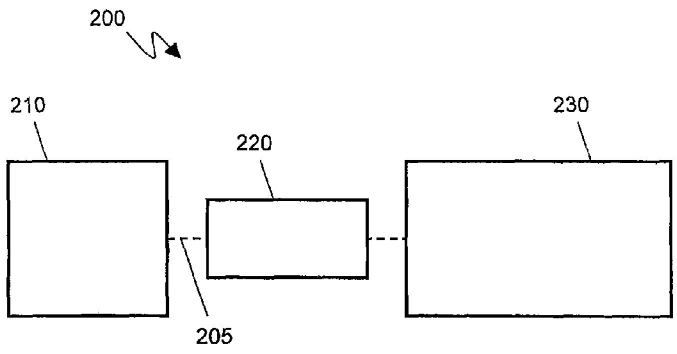
FIG. 7 illustrates a schematic block diagram of an ion-analysis apparatus having a linear ion trap (LIT).
Figure 8A:
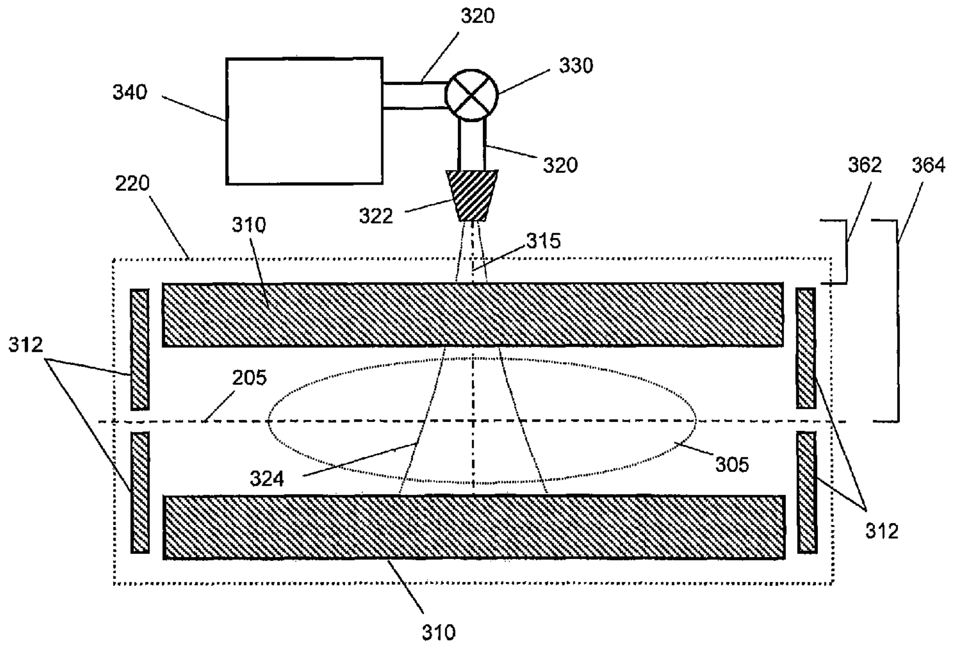
FIG. 8A is an elevational side view schematically depicting a quadrupole linear ion trap and apparatus to inject a gas of neutral collision molecules into the trap.
Figure 8B:
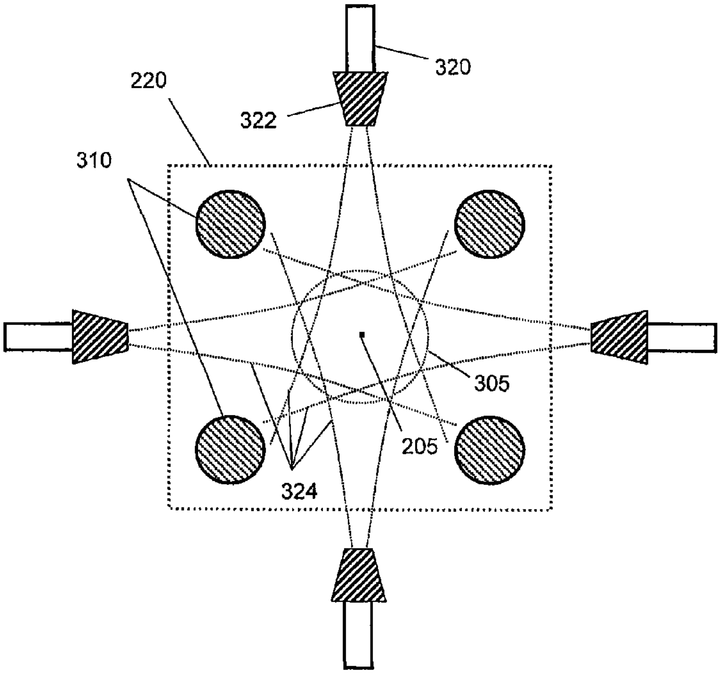
FIG. 8B is an elevational end view of the quadrupole trap schematically portrayed in FIG. 8A. Three gas-injecting nozzles have been added to depict various embodiments.

To better facilitate understanding of further aspects of the present invention, various aspects and embodiments of the methods are discussed in the context of FIGS. 7 and 8A-8B. The block diagram of FIG. 7, schematically depicts an ion-analysis apparatus comprising an ion trap 220, disposed between a source of ions 210, and an ion post-processing element 230. In various embodiments, the source of ions 210 can be, e.g., an ionization source (e.g. the outlet of an electrospray source), the outlet of a mass spectrometer, etc., and the post-processing element 230 can be, e.g., a mass spectrometer, a tandem mass spectrometer or an ion-detection apparatus. In various embodiments, the ion trap comprises a linear ion trap (LIT) such as, e.g., a quadrupole LIT The ion trap 220 can comprise, e.g., several similar ion traps arranged, for example, in series. The ion trap 220 can be one of several types of ion traps including, but not limited to, a quadrupole linear ion trap, a hexapole linear ion trap, and a multipole linear ion trap. In various embodiments, the ion trap 220 is a quadrupole linear ion trap having ion-confining electrodes, oriented substantially parallel to an ion path 205. In various embodiments, the rods (radial confinement electrodes) of the quadrupole linear ion trap have substantially circular cross sections.

Typically in an ion-analysis apparatus having an ion trap, ions originating from the source of ions 210, (typically in gaseous form) are transported substantially along an ion path 205 into the ion trap 220. The path of ion transport is often referred to as the ion axis and does not necessarily need to be linear, that is the path may bend one or more times. The ion axis through the ion trap is typically considered the axial direction within the trap and directions perpendicular to the ion path within the trap are considered radial directions. The ion trap can be used to spatially constrain the ions, and retain them for a period of time within the trap. During this retention time, one or more ion-related operations can be performed such as, for example, electrical excitation, fragmentation, selection, chemical reaction, cooling, spectrometric measurements, etc. Subsequent to the retention time, ions are ejected from the ion trap into an ion post-processing element 230, such as, e.g., a detector, a mass spectrometer, etc. The ejection of the ions from, for example, a LIT can occur, for example, via ejection of the entire ion population along the axis 205 of the ion trap, via mass selective axial ejection (MSAE), via radial ejection from the trap, etc.

In operation, the transfer of ions from a source of ions to an ion trap, and from an ion trap to a post-processing element typically occurs under reduced pressure, typically less than about $10^{-3}$ Torr to avoid, e.g., ion loss, reactions of ions with other gases, excessive detector noise, etc. This pressure is often referred to as the base pressure or ambient pressure existing in the ion trap chamber 220 when no processing operations are occurring in the trap, e.g., when no collision or cooling gas has been added to the ion trap. In various embodiments, the steady-state background pressure is less than about $5\times10^{-5}$ Torr. The loss of ions upon ejection from the ion trap and/or efficiency of transporting them from the ion trap to a post-processing element can depend upon the ambient pressure. In various embodiments, upon ejection of ions from the trap, the pressure is between about $2\times10^{-5}$ Torr to about $5.5\times10^{-5}$ Torr. In various embodiments, the pressure is between about $2\times10^{-5}$ Torr to about $7.5\times10^{-5}$ Torr. In various embodiments, the pressure is between about $2\times10^{-5}$ Torr to about $10^{-4}$ Torr.

Referring to FIGS. 8A-8B, various embodiments of a multipole LIT are depicted schematically. In various embodiments, a multipole LIT comprises four rod-like electrodes 310, radial confinement electrodes, configured to run substantially parallel to the ion path 205 and end-cap electrodes 312 that facilitate the axial confinement of the ions. Electric potentials with DC and AC components can be applied to the rods 310 and end-cap electrodes creating an electric field which confines ions to an ion-confinement region 305 within the trap.

Ions retained within the ion-confining region 305 can be excited by applying an auxiliary alternating potential across at least two of the rods 310 located on opposite sides of the region 305. The auxiliary potential creates an alternating electrical field within the confinement region, which accelerates the ions in an oscillatory motion within the trap. The ions can gain kinetic energy as long as the auxiliary potential is applied. The kinetic energy gained can be transferred into internal ion energy (e.g. vibration, rotation, electronic excitation) when an ion undergoes a collision with another molecule or atom. The internal energy of the ion can increase with multiple successive collisions. When sufficient internal energy is available, fragmentation can result. Collision with a rod or end-cap electrode can result in surface-assisted fragmentation of the ion, or more likely the neutralization and loss of the ion.

In operation, the transfer of ions from a source of ions to an ion trap, and from an ion trap to a post-processing element typically occurs under reduced pressure, typically less than about $10^{-3}$ Torr to avoid, e.g., ion loss, reactions of ions with other gases, etc. This pressure is often referred to as the base pressure or ambient pressure existing in the ion trap chamber when no processing operations are occurring in the trap, e.g., when no collision or cooling gas has been added to the ion trap. In various embodiments, the steady-state background pressure is less than about $5\times10^{-5}$ Torr. The loss of ions upon ejection from the ion trap and/or efficiency of transporting them from the ion trap to a post-processing element can depend upon the ambient pressure. In various embodiments, upon ejection of ions from the trap, the pressure is between about $2\times10^{-5}$ Torr to about $5.5\times10^{-5}$ Torr. Below $2\times10^{-5}$ Torr, the efficiency of the MSAE (mass selective axial ejection) can be impaired. Above $5.5\times10^{-5}$ Torr detector noise can be unacceptable.

In various embodiments, the present methods confine ions within an ion trap and deliver a neutral gas into the ion trap to create a non-steady-state pressure greater than about $5.5\times10^{-5}$ Torr and less than about $5\times10^{-4}$ Torr within at least a portion of the trap for a first elevated pressure duration. For example, referring to FIG. 9, in various embodiments, the pressure elevates from a base operating pressure $P_0$ to a peak value $P_{pk}$. In various embodiments, the peak value can be attained at a time that substantially coincides with termination of gas injection, or can occur after termination of gas delivery depending upon the configuration of the gas-delivery apparatus and vacuum chamber geometry. The pressure, in various embodiments, stays elevated above an elevated-pressure value $P_2$ for a first elevated-pressure duration schematically indicated as the region bounded by the lines 422, 424 in FIG. 9, and eventually pressure restores to the base operating pressure, $P_0$. In various embodiments, the peak pressure $P_{pk}$ attained during ion fragmentation is less than about $5\times10^{-4}$ Torr, the elevated-pressure duration is less than about 25 milliseconds, and the base operating pressure $P_0$ can be about $3.5\times10^{-5}$ Torr and, in various embodiments, is substantially steady-state. In various embodiments, the methods use a neutral collision gas pressure $P_{pk}$ of less than about $5\times10^{-4}$ Torr; and/or less than about $3\times10^{-4}$ Torr and/or in various embodiments, the methods use an elevated-pressure value $P_2$ greater than about $1\times10^{-4}$ Torr and/or greater than about $2\times10^{-4}$ Torr.

Figure 9:
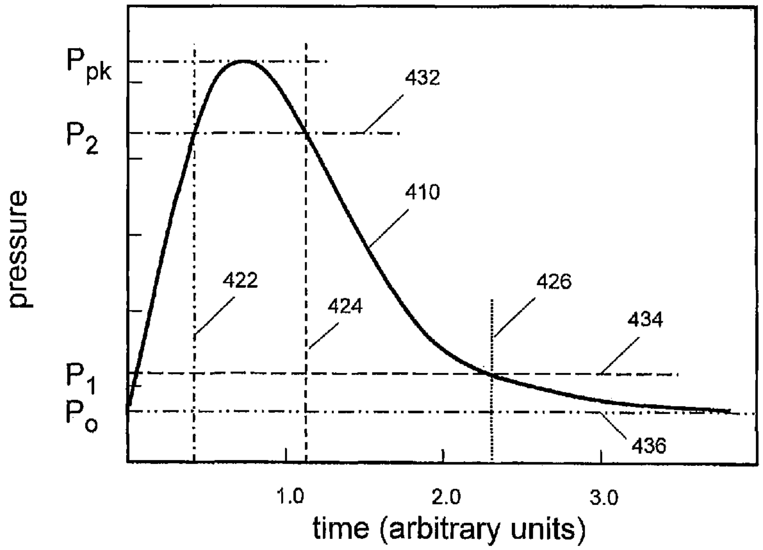
FIG. 9 is an illustrational plot representing a non-steady-state pressure condition within the ion-confinement region during and after injection of a neutral collision gas.

In various embodiments, the application of the auxiliary alternating electrical field is applied substantially at the same time as the pressure in the ion trap reaches a first elevated pressure (e.g., line 422 in FIG. 9). The auxiliary alternating electrical field may be turned on at the same time that the valve is opened to increase the pressure. Alternatively, the excitation or auxiliary alternating electrical field may be turned on after the pressure has had a chance to increase somewhat as long as the operator remains aware of the total time that the valve has been open and the pressure does not rise too high. Optionally, the duration of the application of the auxiliary alternating electrical field, the excitation time, can be extended past the duration of pressure elevation above an elevated-pressure value $P_2$.

In various embodiments, the excitation time is greater than about 10 ms, greater than about 20 ms, greater than about 30 ms, and/or in the range between about 5 ms and about 25 ms. In various embodiments, the first elevated-pressure duration is in the range between about 5 milliseconds to about 25 milliseconds. In various embodiments, the first elevated-pressure duration substantially corresponds to the time the pressure is greater than or equal an elevated-pressure value $P_2$.

In various aspects, the present teachings provide methods for fragmenting ions that facilitate retaining low-mass fragments of the parent ions after termination of the excitation potential. In various embodiments, after termination of the excitation potential and termination of gas injection, the pressure in the trap is reduced (e.g., the collision gas can be evacuated from the trap). The mean time between collisions increases as the pressure decrease, thus providing more time for the internally “hot” ions to fragment. With the reduced thermalization rates the timescale for fragmentation after the excitation is turned off can be extended several milliseconds or more. In various embodiments, the Mathieu stability q parameter associated with the RF trapping potential and parent ion mass can be reduced to allow the remaining hot parent ions to continue dissociating, and to retain more of the low-mass fragments. A reduction of the Mathieu stability q parameter can be accomplished by a reducing the RF trapping potential amplitude and/or increasing angular driving frequency of the RF field. This method facilitates extending the mass range of the fragmentation spectrum to lower mass values.

Various embodiments of the methods of the present teachings create a non-steady-state pressure increase within the ion-confinement region of an ion trap by delivering a neutral gas into the ion trap. A variety of means can be used to deliver the neutral collision gas to the ion-confinement region of the ion trap to produce this non-steady state pressure increase. For example, the neutral gas can be delivered into the trap with a pulsed valve located near the ion-confinement region of the trap. Referring again to FIGS. 8A-8B, in various embodiments, a pulsed valve 330 having a gas-injection nozzle 322 is used to deliver gas from a gas supply 340, connected to the valve by, e.g., tubing 320. The nozzle 322 can be incorporated into the valve 330 with no tubing 320 between them.

In various embodiments, the pulsed valve can be of the type supplied by the Lee Company, Westbrook, Conn., U.S., having a response time of about 0.25 ms, a minimum pulse duration of about 0.35 ms, and an operational lifetime of about $250\times10^6$ cycles. Referring to FIG. 8A, in various embodiments, the nozzle can be located a distance $d_1$ 362 from the rods 310 and a distance $d_2$ 364 from the center of the ion-confining region 305. In various embodiments, $d_1$ is approximately 10 mm and $d_2$ is approximately 21 mm. For quadrupole style traps, the pulsed valve can be located no closer than 2.25 rod diameters from the centre of the ion confinement region. In many embodiments, the pulsed valve can be located at least 3 times the separation of adjacent rods away from the array. Perturbations to the trapping potential may occur if the valve is closer or if the valve is constructed of materials that may charge.

The pulsed valve 330 can be operated remotely with control electronics to introduce a burst of gas into the ion trap. The injected neutral gas provides collision targets for the ions. The timing of the gas injection can be chosen to substantially coincide with the application of the auxiliary alternating potential.

In various embodiments, as gas is delivered from the nozzle 322 it can create a conically-shaped plume of gas. In various embodiments, the apparatus added for gas injection can be located such that the plume 324 substantially impinges on the ion-confinement region 305, facilitating efficient intermixing of the injected molecules with the trapped ions. In various embodiments, the nozzle itself can be designed to deliver a predetermined plume shape.

Various embodiments of the methods of the present teachings eject ions from the trap at the end of the ion retention time. In various embodiments, the pressure in the trap is reduced to a first restored-pressure value prior to ejection to facilitate, e.g., transfer of the ions to further ion optical and/or processing elements. In various embodiments, the first restored-pressure value can be selected, for example, to be the lesser of an allowed operating pressure imposed by ion detectors which may be present in the apparatus and/or a value chosen for efficient ejection of the ions from the trap, e.g., by mass selective axial ejection (MSAE). Generally, ion detectors are pressure sensitive instruments and must be operated below a safe operating pressure to avoid damaging the detector. This safe operating pressure can be selected as the first restored-pressure value.

Figure 10:
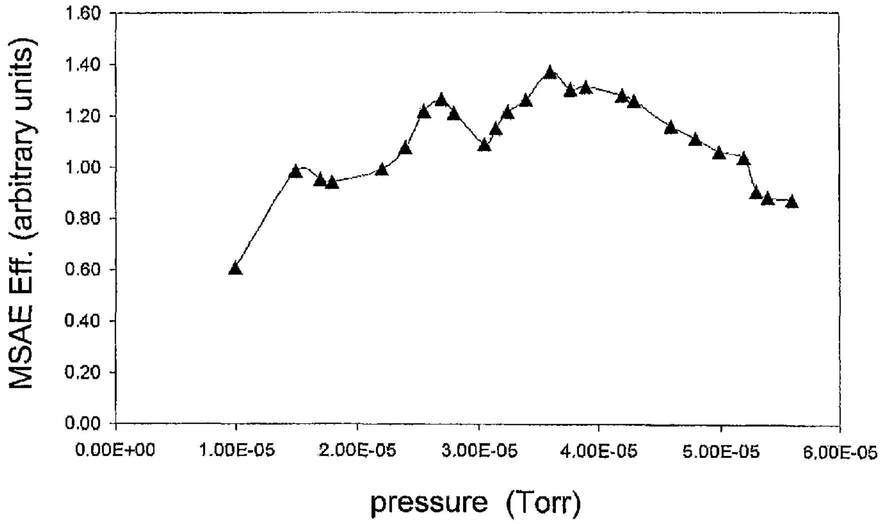
FIG. 10 is an experimentally-measured plot of mass selective axial ejection (MSAE) efficiency as a function of pressure.

Referring again to FIG. 9, the first restored-pressure value can be selected to be substantially equal to the base operating pressure, $P_0$, which in various embodiments can be lower than a safe operating pressure, $P_1$, of any ion detector used in combination with the ion trap. For example, the base operating pressure might be $5\times10^{-5}$ Torr and the safe operating pressure might be $9\times10^{-5}$ Torr Ejection processes, e.g., MSAE, can themselves have pressure dependency. For example, an example of MSAE pressure dependency can be seen in the experimentally-determined plot of FIG. 10. This plot shows that the MSAE efficiency generally decreases for pressures of less than about $3.5\times10^{-5}$ Torr for the experimental configuration tested. In various embodiments, excessive detector noise occurring at pressures greater than about $5\times10^{-5}$ Torr can adversely affect MSAE measurements.

In various embodiments, MSAE is carried out in a range of pressures between about $2\times10^{-5}$ Torr to about $5.5\times10^{-5}$ Torr. In various embodiments, MSAE is carried out in a range of pressures between about $2\times10^{-5}$ Torr to about $7.5\times10^{-5}$ Torr. In various embodiments, MSAE is carried out in a range of pressures between about $2\times10^{-5}$ Torr to about $1\times10^{-4}$ Torr.

In various embodiments, the peak pressure $P_{pk}$ attained due to neutral collision gas delivery is within about a factor of ten of the base operating pressure, $P_0 \leqq 5\times10^{-5}$ Torr, for the ion trap. In various embodiments, reducing peak pressure can reduce, for ion chambers of the same volume and having the same vacuum pumping speeds, the pressure-recovery time, e.g., the time between the lines 424 and 426 in FIG. 9 during which the chamber restores to pressure $P_1$, and thus, in various embodiments, ions which have been fragmented under conditions of lower peak pressure elevation can be made available for subsequent ion processing more quickly.

Numerical Simulations

Without being held to theory, numerical simulations are presented to further convey and facilitate understanding of the present teachings. It is to be understood that the rate of fragmentation of an ion, for example via dipole excitation, can depend on a number of variables inter-related in a complex manner. For example, excitation amplitude, duration of the excitation, mass of the collision partner, efficiency of conversion of kinetic energy into internal energy of the ion, the rate of internal energy cooling of the ion through damping collisions with the background gas and/or radiative cooling, redistribution of the internal energy within the ion, density of the collision gas and the type of chemical bond that is fragmenting, etc. can all be factors. Here, results from studies carried out for a variety of ion masses, gas-injection durations, excitation amplitudes, excitation times, and pressures are presented.

An upper limit to the amount of energy available for deposition into the internal degrees of freedom (vibration and rotation) of an ion can be estimated by calculating the center-of-mass collision energy between the ion and the collision partner. The center-of-mass collision energy $E_{cm}$ can be determined from the equation, $$E_{cm} = E_{lab}\frac{m_2}{m_1 + m_2} \quad (2)$$

where $m_1$ is the mass of the ion, $m_2$ is the mass of the neutral collision partner and $E_{lab}$ is the kinetic energy of the ion in the laboratory frame of reference. During the process of dipolar excitation, e.g. application of an auxiliary alternating potential to the ion trap's electrodes, energy is fed into the ion in the form of kinetic energy, however, the ion can lose kinetic energy through collisions with neutral molecules in a collision gas that may be present, leaving the ion with kinetic energy, $E'_{lab}$, where the prime notation does not indicate a derivative but only a potentially different value of energy than that given by the variable $E_{lab}$. The amount of kinetic energy lost is the difference between the two values $E_{lab}$, $E'_{lab}$ and can be determined using the following equation:

$$\begin{aligned} E_{loss} &= E_{lab} - E'_{lab} \\ &= E_{lab}\left(1 - \frac{(m_1^2 + m_2^2)}{(m_1 + m_2)^2}\right) \end{aligned} \quad (3)$$

Using Eqn (2) and Eqn (3), the relation of $E_{cm}$ to $E_{loss}$ can be written as:

$$E_{cm} = E_{loss}\frac{m_1 + m_2}{2m_1} \quad (4)$$

which reduces to approximately 0.5 $E_{loss}$ when $m_1 >> m_2$. During excitation the ion can have both high and low kinetic energies, depending upon the location in the ions' trajectory. Collisions with collision energies on the order of the thermal energy, e.g., various lower kinetic energy regions of a trajectory, can lead to either an increase or a decrease in the internal energy of the ion. The amount of energy available for internal excitation is proportional to the centre of mass collision energy.

The rate of energy input into the ion $E_{cm}$/collision/unit time during the excitation process affects the rate of ion fragmentation. The fragmentation rate of an ion can be increased provided the rate of energy input into the ion can be increased faster than the rate of thermalization is increased, and provided the ion does not collide with an electrode or is otherwise lost from the trap. Collisions with electrodes, for example, predominantly neutralize the ion, and result in its loss.

To better understand these processes and the present teachings, an ion-trajectory simulator was used to investigate the rate of energy input into an ion. The simulator takes into account the center-of-mass collision energy for each individual collision, the effects of thermal velocities for both the ion and the neutral collision gas, the effects of the RF confinement field (trapping alternating potential) and the effects of higher-order fields due to the round cross-sectional shape of the quadrupole electrodes.

The energy input rate, $E_{cm}$/collision/unit time, provides an upper limit to the amount of energy that can be transferred from kinetic energy into internal energy of the ion. It is found that this rate can depend upon the pressure in the trap and excitation amplitude $V_{exc}$. The excitation amplitude, $V_{exc}$, is taken here as the zero-to-peak amplitude of the auxiliary alternating potential applied to two of the quadrupole electrodes. The duration of energy gain for an ion can depend on the excitation amplitude, e.g., if $V_{exc}$ is too high then the ions can attain high transverse motion amplitude and, e.g., collide with an electrode, and the energy-gain duration will be shortened.

Table 1 shows the results from simulations of ion fragmentation under three different conditions, designated A, B and C, within a linear ion trap having rods with substantially circular cross sections. The excitation amplitude, $V_{exc}$, listed in the third column represents the zero-to-peak amplitude of the auxiliary alternating potential applied to two of the quadrupole rods in the simulation. The resulting average duration of ion trajectories is listed in the fourth column, and represents the amount of time, on average, an ion undergoes oscillations within the trap before colliding with a rod. The energy input rate, $E_{cm}$/collision/unit time, the collisions per unit time, collisions/unit time, and the total center-of-mass collision energy, $E_{cm}$, acquired are listed in the adjacent columns. For the simulations, the collision partner was taken to be neutral nitrogen molecules, and the ion chosen was reserpine (m/z=609).

In cases A and B the pressure within the ion-confinement region was $3.5\times10^{-5}$ Torr, the maximum excitation period allowed was 100 ms, and the amplitudes of the auxiliary potential, $V_{exc}$, were 7.5 $mV_{(0\text{-}pk)}$ and 30 $mV_{(0\text{-}pk)}$, respectively. In case C the pressure was elevated to $3.5\times10^{-4}$ Torr, $V_{exc}$ was 30 $mV_{(0\text{-}pk)}$, and the excitation period was 25 ms. The tabulated results are obtained from an average of 10 ion trajectories, each with an individual set of initial starting conditions. For the simulations, ions were randomly distributed within a 1.0 mm radius of the axis of the trap. The ions were then cooled for a period of 5 ms at a pressure of 5 mTorr. Nitrogen was used as the neutral collision gas, and a collision cross-section of 280 Å was used. The final spatial coordinates and kinetic energies were used as input for the next stage of the simulation. In the next stage of the simulation, the collision frequency, scattering angle and initial RF phase were chosen randomly.

TABLE 1

| case | pressure mTorr | $V_{exc}$ $mV_{(0\text{-}pk)}$ | trajectory duration (avg) ms | $E_{cm}$/ collision/unit time eV/ms | Collisions/ unit time/ ms | $E_{cm}$ (total) eV |
|---|---|---|---|---|---|---|
| A | 0.035 | 7.5 | 93 | 0.81 | 3.52 | 75.6 |
| B | 0.035 | 30 | 1.8 | 0.76 | 3.27 | 1.37 |
| C | 0.350 | 30 | 25 | 6.84 | 33.7 | 171 |

For the simulation corresponding to case A, the ion was, on average, accelerated for about 93 ms before gaining large enough transverse motion to collide with an electrode. Increasing the excitation amplitude to 30 $mV_{(0\text{-}pk)}$ (case B) was not seen to increase the rate of energy input into the ion $E_{cm}$/collision/unit time. Instead, the ion trajectory was seen in the simulation to terminate after 1.8 ms, and the total amount of $E_{cm}$ available for collisions was significantly reduced. For case B most of the ions in the simulation collided with a rod prior to receiving sufficient energy to fragment within the trap.

An elevation of the pressure to $3.5\times10^{-4}$ Torr during ion excitation and excitation at $V_{exc}$=30 $mV_{(0\text{-}pk)}$ in the simulation (case C) was seen to result in none of the ion trajectories terminating upon a quadrupole rod prior to the 25 ms upper time limit. The amount of $E_{cm}$/collision/unit time was seen to increase by a factor of about 8 over cases A and B. The total $E_{cm}$ available for collisions was seen to increase by more than a factor 2 over case A and more than a factor of 125 over case B, even though the maximum excitation time in the simulation was reduced from 100 ms for cases A and B to 25 ms for case C. The average duration of an ion trajectory increases in case C from case B, which was attributed to increased collisions with the neutral gas molecules. It is therefore believed, without being held to theory, that increasing the pressure during fragmentation in the low-pressure LIT can provide for an increase in the rate of energy input into the ion and the use of higher excitation amplitudes without substantial loss of ions due to loss from the trap, e.g., collisions with electrodes. It is believed, without being held to theory, that the collision gas acts as a buffer to dampen the transverse excursions of the ion trajectories.

EXAMPLES

Ion fragmentation experiments were carried out in a quadrupole linear ion trap. Details and results of these experiments are presented by way of examples. These examples illustrate various embodiments of the present teachings, but are not to be construed to limit the scope thereof.

Ion fragmentation experiments were carried out in a modified Applied Biosystems 4000 Q Trap® quadrupole linear ion trap. The ion-confining rods of the ion trap had substantially circular cross sections. A pulsed valve was used to deliver the collision gas (nitrogen), and the arrangement was similar to that shown in FIG. 2A. The pulsed valve was from The Lee Company, Westbrook, Conn., U.S., having a response time of 0.25 ms, an operational lifetime specified as 250 million cycles, and a minimum pulse duration of 0.35 ms. Opening the pulsed valve for a period of time allowed the pressure to be increased in at least a portion of the linear ion trap during dipolar excitation of the ions. Experiments were carried out using gas-injection pulse durations ranging from 5 ms to 100 ms with 25 ms as the typical duration. In these experiments, a vacuum-pressure interlock was set at a vacuum gauge reading of $9.5\times10^{-5}$ Torr, to protect the detectors. The vacuum gauge was attached to the vacuum chamber, which housed the LIT, and the pressure measured at the gauge was therefore lower than the pressure value in the ion-trapping region of the LIT after gas injection. The difference in pressure was due to the distance from the gas injection source, e.g. the pulsed valve, and dispersion of the injected gas. The pulsed valve was backed by 150 Torr of nitrogen, and the valve had an outlet aperture of 0.076 mm diameter. The base pressure in the LIT chamber, with the pulsed valve closed, was $3.7\times10^{-5}$ Torr. The pulsed valve was located as close to the linear ion trap as possible, without interfering with the RF trapping fields. In the experiments, the valve's orifice was located about 21 mm from the center of the quadrupole rod assembly, for example the distance 264 in FIG. 2A was about 21 mm. In various embodiments, the proximal location of the valve, or its output orifice, to the ion-confinement region can reduce the total amount of injected gas required for a desired elevation of pressure within the ion confinement region.

Fragmentation experiments were carried out for five compounds, listed in Table 2, spanning a mass range from 129 m/z to 514.7 m/z. After dissociation the ion fragments were analyzed in a mass spectrometer. Fragmentation efficiencies were calculated for each compound by integrating the fragmentation mass spectra substantially over the mass ranges shown in Table 2.

TABLE 2

| compound (mode) | ion mass m/z | mass range integrated m/z |
|---|---|---|
| Fluorouracil (5-FU) (−ve) | 129.0 | 35 to 119 |
| Caffeine (+ve) | 195.2 | 50 to 190 |
| Caffeine (+ve) | 138.0 | 50 to 135 |
| Lidocaine (+ve) | 235.3 | 50 to 230 |
| Taurocholic Acid (−ve) | 514.7 | 130 to 513 |

Example 1

Caffeine

Figure 11:
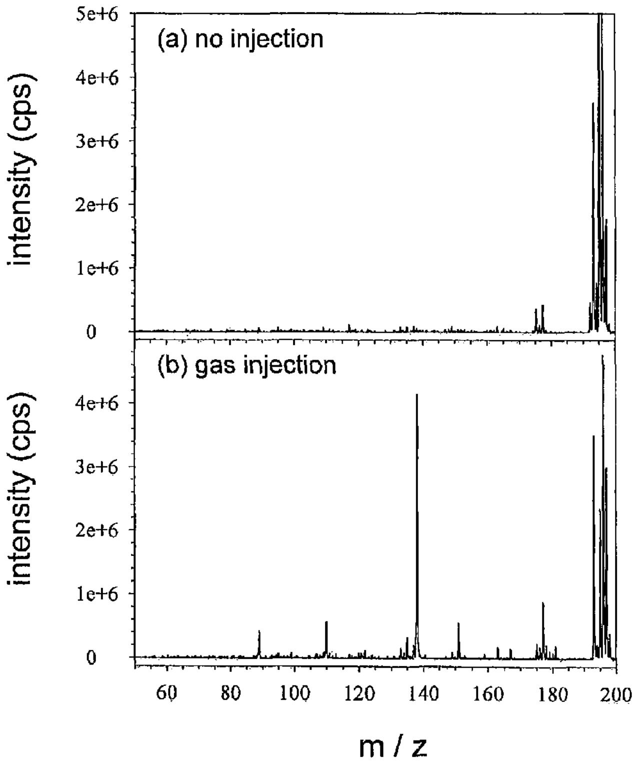
FIG. 11 compares mass spectra obtained from the fragmentation of a caffeine ion (m/z=195.2): (a) without injection of the gas of collision molecules, (b) with gas injection.

A comparison of the fragmentation of a caffeine ion, m/z=195, without, and with, injection of a neutral collision gas of neutral collision is shown in FIG. 11. The top spectrum (a) corresponds to the condition where no collision gas is injected during fragmentation, and it yields a 2.1% fragmentation efficiency when exciting the parent ions at 12.5 $mV_{(0\text{-}pk)}$ amplitude in a base pressure of $3.7\times10^{-5}$ Torr. The bottom spectrum shows 13.1% fragmentation efficiency when exciting the same ion at an amplitude of 21.5 $mV_{(0\text{-}pk)}$ with the pulsed valve used to inject the collision gas. For each trial the excitation time was 25 ms. In this experiment the injection of the collision gas increased the fragmentation efficiency by more than a factor of six.

Example 2

Lidocaine

Figure 12:
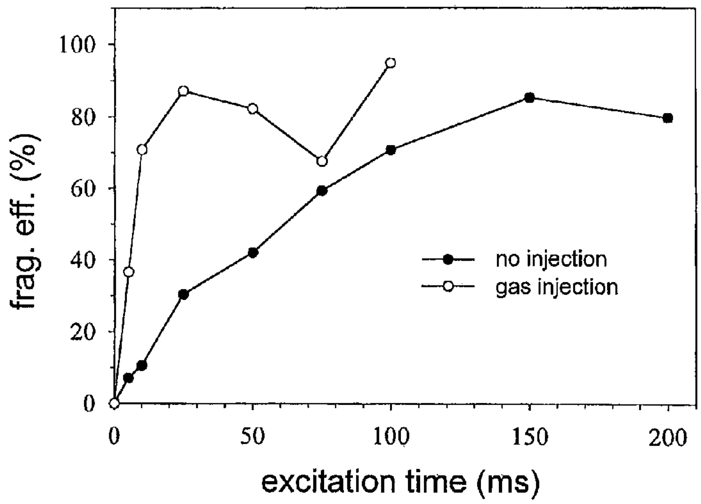
FIG. 12 shows two plots of fragmentation efficiency of a lidocaine ion (m/z=235) as a function of the excitation time: (open circles) with injection of the gas of collision molecules, (filled circles) without gas injection.

Without injection of the collision gas, less fragmentation for short excitation times was observed. Referring to FIG. 12, the fragmentation efficiency for a Lidocaine ion, m/z=235, with (open circles) and without (filled circles) collision gas injection, is shown. For an excitation time of 10 ms the fragmentation efficiency is about 10% without injection and about 75% with injection, a gain in fragmentation efficiency by a factor of about 7.5. For an excitation time of 25 ms the gain in efficiency drops to about 2.9, and at 100 ms the gain drops even further to about 1.3. The data shows that the fragmentation efficiency, with gas injection, for this ion does not improve significantly for excitation times beyond about 25 ms, whereas the fragmentation efficiency, without gas injection, for the same ion slowly improves for excitation times up to 150 ms. However, using the present teachings the same efficiency seen at 150 ms without collision gas can be obtained in about 25 ms with collision gas using the present teachings.

Example 3

Excitation Period

Figure 13:
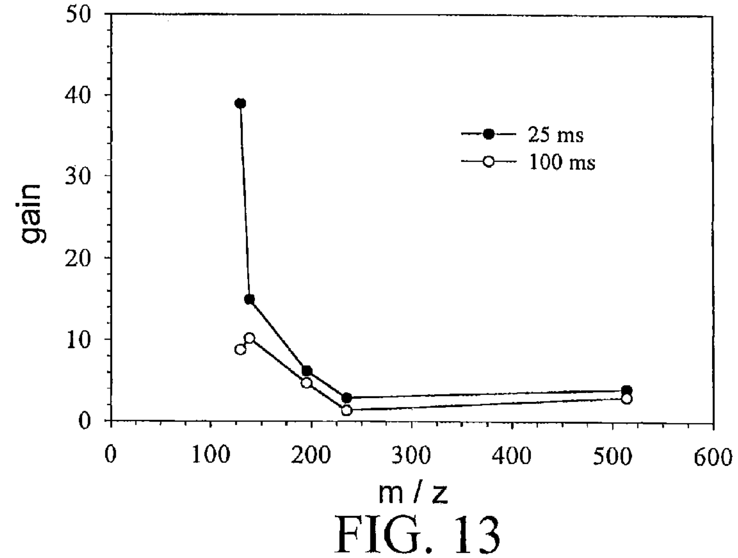
FIG. 13 compares gain in fragmentation efficiencies for ions of different m/z ratios excited for two different periods: 25 ms and 100 ms. The largest gains in fragmentation efficiency are observed for shorter excitation periods and smaller m/z ratios.

A plot of the gain in ion fragmentation efficiency under conditions of collision gas injection compared to conditions without gas injection for various m/z ratios for two different excitation periods is shown in FIG. 13. The ions fragmented were those listed in Table 2. Two data sets are shown corresponding to excitation times of 25 ms (filled circles) and 100 ms (open circles). For each measurement the excitation amplitude was selected to maximize fragmentation of the parent ion. The data of FIG. 13 shows that the observed gains in fragmentation efficiency are greatest for short excitation times and low ion masses.

Example 4

Low Mass Fragments

Experiments were carried to detect the presence of low-mass ion fragments in the linear ion trap after termination of the excitation potential. The Mathieu parameter for the experiments was q=0.2373. At this value, the low-mass cutoff would be about 397 Da: LMCO=1522·0.2373÷0.908. Trials were carried out with gas injection and without gas injection into the trap during ion excitation. The experimentally-measured mass spectra of FIGS. 14A-14B were obtained from these fragmentation experiments for the Agilent ion—a homogeneously substituted fluorinated Triazatriphosphorine known as 2,2,4,4,6,6-hexahydro-2,2,4,4,6,6-hexakis ((2,2,3,3,4,4,5,5-octafluoropentyl)oxy)-1,3,5,2,4,6-triazatriphosphorine (see U.S. Pat. No. 5,872,357 which holds the patent on this ion as a mass calibrant)—having a mass of 1522 Da. The spectra record the intensity of signals from detected ions, in counts per second, for a range of masses from about 150 Da to about 450 Da. The excitation time for both cases was about 20 ms.

Lower q Value Following Excitation

Figure 14A:
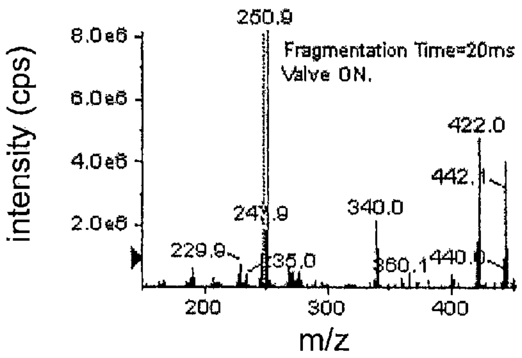
FIG. 14A shows a mass spectrum obtained from the fragmentation of the Agilent ion—a homogeneously substituted fluorinated Triazatriphosphorine known as 2,2,4,4,6,6-hexahydro-2,2,4,4,6,6-hexakis ((2,2,3,3,4,4,5,5-octafluoropentyl)oxy)-1,3,5,2,4,6-triazatriphosphorine—having a mass of 1522 Da, with injection of a gas of collision molecules. The Mathieu parameter was 0.2373 and ion fragments below the low-mass cut-off of 397 Da were readily observed.
Figure 14B:
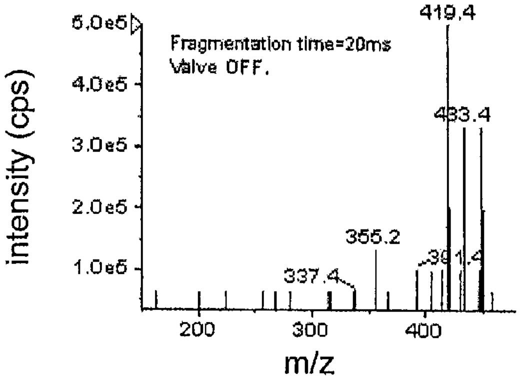
FIG. 14B shows a mass spectrum for conditions similar to FIG. 14A except no collision gas was injected. The amount of low-mass fragments observed was significantly reduced.

For the ion fragmentation measurement of FIG. 14A, the pressure was elevated in the ion-confinement region by gas injection with a pulsed valve. Low-mass ion fragments were observed, as well as ions with masses below the typical LMCO, when the excitation q was lowered as described above. For the fragmentation measurement of FIG. 14B, no collision gas was injected during fragmentation. Significantly fewer low-mass fragments were observed.

Since low-mass ions are generated efficiently during the fragmentation process at elevated pressure, the ion-trapping q parameter can be reduced to retain the fragments with masses below the initial LMCO value. As the q parameter is reduced, the LMCO value reduces and more low-mass ions are retained in the trap. As described above, the q parameter can be reduced by lowering the ion-trapping RF potential applied to the trap's electrodes and/or increasing the angular frequency of the RF potential. The decrease in q can comprise one or more of a substantially linear decrease in time, a substantially piecewise linear decrease in time, a substantially nonlinear decrease in time, and combinations thereof.

Figure 15A:
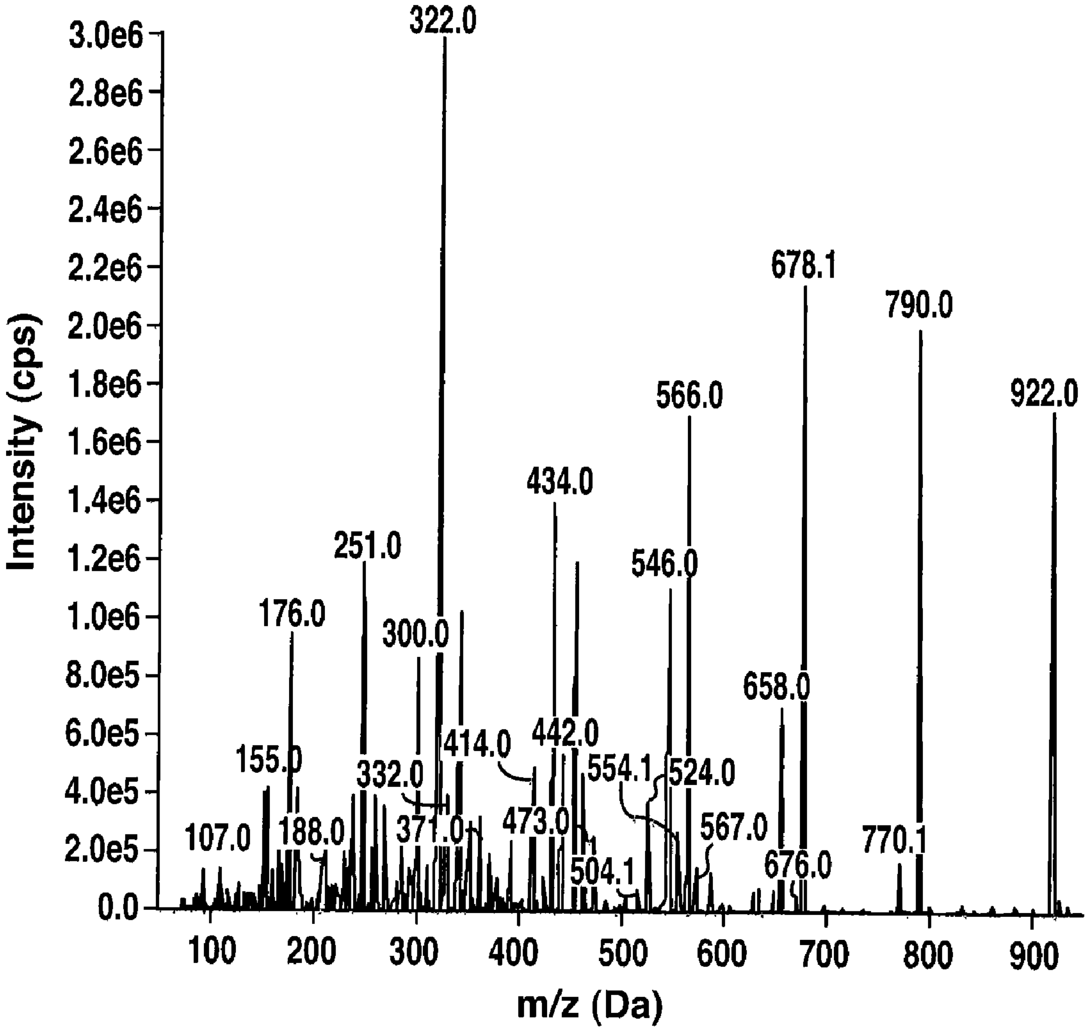
FIG. 15A shows a mass spectrum obtained from the fragmentation of an ion of mass 922 Da with injection of a gas of collision molecules during ion excitation using a pulsed valve. Low-mass ion fragments were retained in the trap, and observed in the mass spectrum.
Figure 15B:
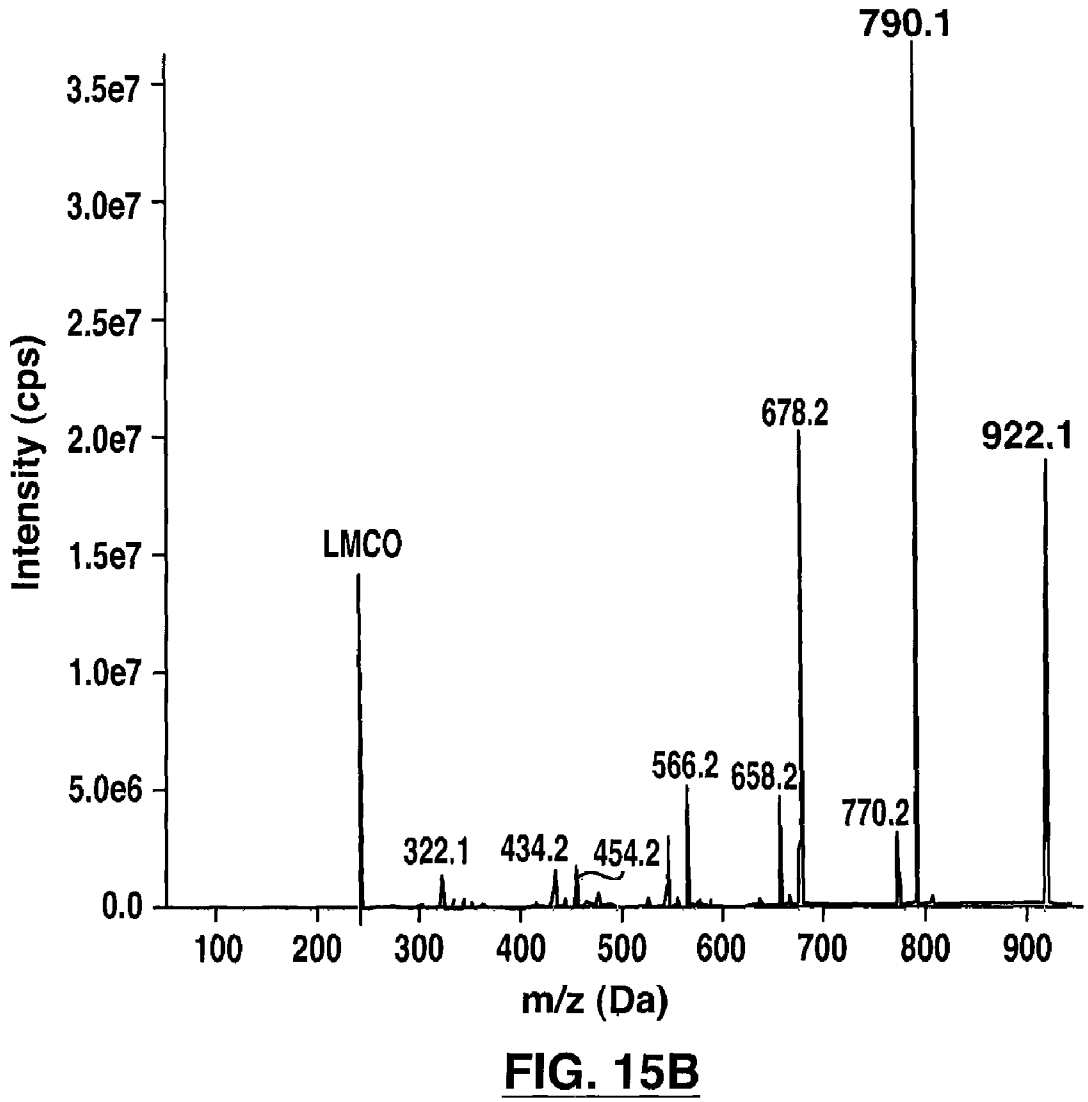
FIG. 15B shows a mass spectrum corresponding to the conditions used in FIG. 15A except no collision gas was injected into the ion trap during ion excitation. Substantially fewer low-mass ion fragments were observed.

FIGS. 15A-15B provide another example of low-mass ion-fragment retention within the ion trap. For this example, an ion of mass 922 Da was excited with an initial q value of about 0.237. This value of q yields a LMCO value of about 240 Da, as is indicated in FIG. 15B. For the case shown in FIG. 15A the pulsed valve was used to inject an inert gas into the trap during excitation. Low-mass ion fragments, below the initial LMCO, are clearly visible in the mass spectrum. For the case shown in FIG. 15B no gas was injected into the ion trap during excitation. Fewer low-mass fragments were observed above the initial LMCO, and substantially no low-mass fragments were observed below the initial LMCO. According, it can be advantageous to combine providing an inert gas into the trap during excitation with reducing the q parameter following excitation.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

Other variations and modifications of the invention are possible. For example, many different linear ion trap mass spectrometer systems (in addition to those described above) could be used to implement methods in accordance with aspects of different embodiments of the present invention. All such modifications or variations are believed to be within the sphere and scope of the invention as defined by the claims appended hereto.

The invention claimed is:

1. A method for fragmenting ions in an ion trap of a mass spectrometer comprising:

a) selecting parent ions for fragmentation;

b) retaining the parent ions within the ion trap for a retention time interval, the ion trap having an operating pressure of less than about $1\times10^{-4}$ Torr;

c) providing a RF trapping voltage to the ion trap to provide a Mathieu stability parameter q at an excitement level during an excitement time interval within the retention time interval;

d) providing a resonant excitation voltage to the ion trap during the excitement time interval to excite and fragment the parent ions;

e) providing a non-steady-state pressure increase of at least 10% of the operating pressure within the ion trap by delivering a neutral gas into the ion trap for at least a portion of the retention time interval to raise the pressure in the ion trap to a varying first elevated-pressure in the range between about $6\times10^{-5}$ Torr to about $5\times10^{-4}$ Torr for a first elevated-pressure duration; and, f) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap;

wherein the excitation time interval and the first elevated-pressure duration substantially overlap in time.

2. The method as defined in claim 1 wherein the excitement time interval is between about 1 ms and about 150 ms in duration.

3. The method as defined in claim 2 wherein the excitement time interval is less than about 50 ms in duration.

4. The method as defined in claim 2 wherein the excitement time interval is greater than about 2 ms in duration.

5. The method as defined in claim 2 wherein the excitement time interval is greater than about 10 ms in duration.

6. The method as defined in claim 2 wherein the resonant excitation voltage has an amplitude of between about 50 mV and about 250 mV, zero to peak.

7. The method as defined in claim 2 wherein the resonant excitation voltage has an amplitude of between about 50 mV and about 100 mV, zero to peak.

8. The method as defined in claim 2 wherein the excitement level of q is between about 0.15 and about 0.9.

9. The method as defined in claim 2 wherein the hold level of q is above about 0.015.

10. The method as defined in claim 2 wherein c) comprises determining the excitement time interval based at least partly on the operating pressure in the ion trap, such that the excitement time interval varies inversely with the operating pressure in the ion trap; and, d) comprises determining an amplitude of the resonant excitation voltage based at least partly on the operating pressure in the ion trap, such that the amplitude of the resonant excitation voltage varies inversely with the operating pressure in the ion trap.

11. The method as defined in claim 2 wherein e) comprises determining the hold level of q to be i) sufficiently high to retain the parent ions within the ion trap, and ii) sufficiently low to retain within the ion trap fragments of the parent ions having a fragment m/z less than about one fifth of a parent m/z of the parent ions.

12. The method as defined in claim 2 wherein the excitement level of q is between about 0.15 and about 0.39.

13. The method as defined in claim 12 wherein the excitement time interval is greater than about 10 ms.

14. The method as defined in claim 13 wherein the resonant excitation voltage has an amplitude of between about 50 mV and about 100 mV, zero to peak.

15. The method as defined in claim 2 wherein the resonant excitation voltage has an amplitude of between about 50 mV and about 1000 mV, zero to peak.

16. The method as defined in claim 2 wherein the resonant excitation voltage is terminated substantially concurrently with the RF trapping voltage applied to the ion trap being changed to reduce the Mathieu stability parameter q to the hold level.

17. The method as defined in claim 2 wherein, in b), the ion trap has an operating pressure of less than about $5\times10^{-5}$ Torr.

18. The method as defined in claim 2 wherein the hold level of q is at least about ten percent less than the excitement level of q.

19. The method of claim 2 wherein the non-steady-state pressure increase is at least 50% of the operating pressure within the ion trap.

20. The method of claim 2 wherein delivering the neutral gas comprises injecting the neutral gas from one or more pulsed valves.

21. The method of claim 2 wherein the neutral gas comprises one or more of hydrogen, helium, nitrogen, argon, oxygen, xenon, krypton, methane, and combinations thereof.

22. The method of claim 2 wherein e) comprises starting delivering the neutral gas into the ion trap before the excitement time interval.

23. The method according to claim 1 wherein the first restored-pressure value is in the range between about $2\times10^{-5}$ Torr to about $5.5\times10^{-5}$ Torr.

24. The method of claim 2 wherein the non-steady-state pressure increase is at least 100% of the operating pressure within the ion trap.

* * * * *